US008318382B2

(12) United States Patent
Tamura et al.

(10) Patent No.: US 8,318,382 B2
(45) Date of Patent: Nov. 27, 2012

(54) FUEL CELL ELECTRODE CONTAINING PROTON CONDUCTIVE INORGANIC OXIDE

(75) Inventors: Jun Tamura, Kanagawa-ken (JP); Yoshihiko Nakano, Kanagawa-ken (JP); Wu Mei, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1360 days.

(21) Appl. No.: 11/537,219

(22) Filed: Sep. 29, 2006

(65) Prior Publication Data

US 2007/0082257 A1    Apr. 12, 2007

(30) Foreign Application Priority Data

Sep. 29, 2005   (JP) .................................. 2005-285594

(51) Int. Cl.
*H01M 4/36* (2006.01)
*H01M 4/90* (2006.01)
(52) U.S. Cl. ........................................ 429/523; 429/528
(58) Field of Classification Search .................. None
See application file for complete search history.

(56) References Cited

U.S. PATENT DOCUMENTS

| 5,830,242 | A * | 11/1998 | Yao ................................. 23/300 |
| 2004/0038105 | A1 | 2/2004 | Hennige et al. |
| 2004/0072061 | A1* | 4/2004 | Nakano et al. ................... 429/44 |
| 2004/0234839 | A1 | 11/2004 | Wakizoe et al. |
| 2006/0019148 | A1* | 1/2006 | Tamura et al. ................... 429/44 |

FOREIGN PATENT DOCUMENTS

| JP | 2000-285933 | 10/2000 |
| JP | 2001-102071 | 4/2001 |
| JP | 2002-246033 | 8/2002 |
| JP | 2003-317737 | 11/2003 |
| JP | 2004-79244 | 3/2004 |
| JP | 2004-158261 | 6/2004 |
| JP | 2004-185863 | 7/2004 |
| JP | 2005-72015 | 3/2005 |

OTHER PUBLICATIONS

Machine Translation of JP 2000-285933, Ozu et al., Oct. 13, 2000.*
U.S. Appl. No. 12/372,135, filed Feb. 17, 2009, Tamura, et al.
U.S. Appl. No. 11/744,267, filed May 4, 2007, Tamura, et al.
Eiji Higuchi, et al., "Gas diffusion electrodes for polymer electrolyte fuel cells using borosiloxane electrolytes", Solid State IONICS 171, 2004, pp. 45-49.
U.S. Appl. No. 11/389,088, filed Mar. 27, 2006, Tamura, et al.

* cited by examiner

*Primary Examiner* — Barbara Gilliam
*Assistant Examiner* — Kwang Han
(74) *Attorney, Agent, or Firm* — Oblon, Spivak, McClelland, Maier & Neustadt, L.L.P.

(57) ABSTRACT

According to one embodiment, a catalyst layer of an electrode for a fuel cell has a proton conductive inorganic oxide containing an oxide superacid compound. The compound contains an element X (Titanium, Zirconium, Silicon, Tin, Hafnium, Germanium, Gallium, Indium, Cerium, Niobium or Aluminum) and an element Y (Tungsten, Molybdenum, Chromium, Boron or Vanadium). The catalyst layer also contains a reduction-oxidation metal catalyst or a carrier carrying a reduction-oxidation metal catalyst.

15 Claims, 4 Drawing Sheets

FUEL CELL ELECTRODE CONTAINING PROTON CONDUCTIVE INORGANIC OXIDE

CROSS-REFERENCE TO RELATED APPLICATION

This application is based upon and claims the benefit of priority from the prior Japanese Patent Application No. 2005-285594, filed on Sep. 29, 2005; the entire contents of which are incorporated herein by reference.

BACKGROUND OF THE INVENTION

1. Field

One embodiment of the present invention relates to an electrode containing proton conductive material, a membrane electrode composite, and a fuel cell containing the membrane electrode complex.

2. Related Art

A Fuel cell has a fuel electrode (anode) on one side of a proton conductive solid electrolyte membrane, and an oxidant electrode (cathode) on the other side thereof. Upon feeding a fuel, such as hydrogen and methanol, to the anode, the fuel is electrochemically oxidized in the anode to produce protons and electrons. The electrons run out to an external circuit. The protons reach the cathode through the proton conductive solid electrolyte and form water through reaction with an oxidant fed to the cathode and electrons from the external circuit.

The anode and cathode are required to have excellent proton conductivity. As the proton conductive material, for example, a perfluorosulfonic acid-containing polymer (such as Nafion®, produced by Du Pont, Inc.) has been known. In order to miniaturize a fuel cell system, a liquid fuel, such as methanol, is often used at a high concentration. The perfluorosulfonic acid-containing polymer is dissolved in methanol of a high concentration when it is used as a proton conductive organic binder of an electrode catalyst layer. In particular, the dissolution of the perfluorosulfonic acid-containing polymer is accelerated at a high temperature of 100° C. or higher for obtaining high output or on exothermic heat associated with the electric power generation.

As an inorganic solid acid proton conductive material, a sulfuric acid-supporting metal oxide exhibiting solid superacidity has been known (as disclosed in Japanese Patent Disclosure No. 2004-158261A1). Specifically, the sulfuric acid is supported on a surface of an oxide containing at least one element selected from zirconium, titanium, iron, tin, silicon, aluminum, molybdenum and tungsten, and fixed thereon through a heat treatment. The sulfuric acid-supporting metal oxide exhibits proton conductivity with sulfate radical fixed thereon, and the sulfate radical is lost through hydrolysis, thereby decreasing the proton conductivity. Accordingly, it is unstable as a proton conductive solid electrolyte, particularly a fuel cell using a liquid fuel, for a long period of time.

As a proton conductive inorganic binder for an electrode catalyst layer, a borosiloxane proton conductive solid electrolyte having a sulfonic acid group has been known (as disclosed in Eiji Higuchi, Hiroyuki Uchida, Tatsuo Fujinami and Masahiro Watanabe, Solid State Ionics, vol. 171, pp. 45 to 49 (2004)). The sol solution of a metal alkoxide as a raw material of borosiloxane having a sulfonic acid group is mixed with catalyst particles, and the resulting slurry is applied to carbon paper, followed by subjecting to a heat treatment, to use as a binder of a catalyst layer. The borosiloxane electrolyte having a sulfonic acid group requires a large amount of water (entrainment water) for proton conductivity through a sulfonic acid group, as similar to the aforementioned perfluorosulfonic acid-containing polymer. In electric power generation at a high temperature, under which water is difficult to regain, the water required for proton conductivity is decreased in amount to lower the proton conductivity significantly. There is a possibility of dropout a sulfonic acid group during a long period of time.

As a proton conductive inorganic material for an electrode catalyst layer, the use of inorganic glass containing $P_2O_5$ and $SiO_2$ has been known (as disclosed in Japanese Patent Disclosure No. 2001-102071A1). A sol or a wet gel containing a metal alcoholate as a raw material of inorganic glass containing $P_2O_5$ and $SiO_2$ is applied to surfaces of a fuel electrode and an oxidant electrode, followed by drying and heating, to bind the catalyst layer. The inorganic glass containing $P_2O_5$ and $SiO_2$ utilizes an OH group on the glass surface for attaining proton conductivity, but upon operation at a high temperature, the OH group is eliminated through drying to decrease the proton conductivity. Furthermore, there is a possibility of eluting the $P_2O_5$ component constituting the glass skeleton into water during a use for a long period of time.

SUMMARY OF THE INVENTION

According to one aspect of the present invention, an electrode for a fuel cell comprises a catalyst layer. The catalyst layer comprises a reduction-oxidation metal catalyst or a carrier carrying a reduction-oxidation metal catalyst, and a proton conductive inorganic oxide coat. The proton conductive oxide coat may be formed on at least part of the reduction-oxidation metal catalyst or the carrier carrying the reduction-oxidation metal catalyst. The proton conductive inorganic oxide coat may contain an oxide superacid compound. The oxide superacid compound may contain an oxide of element X and an oxide of element Y. The element X may be at least one element selected from the group consisting of Titanium, Zirconium, Silicon, Tin, Hafnium, Germanium, Gallium, In, Cerium, Niobium and Aluminium, and the element Y may be at least one element selected from the group consisting of TUNGSTEN, Molybdenum, Chromium, Boron and Vanadium.

According other aspect of the present invention, an electrode for a fuel cell comprises a catalyst layer. The catalyst layer may comprise a plurality of reduction-oxidation metal catalyst or a plurality of carriers formed with reduction-oxidation metal catalyst, and a proton conductive inorganic oxide binder contacting and binding the plurality of reduction-oxidation metal catalyst or the plurality of carriers formed with reduction-oxidation metal catalyst. The proton conductive inorganic oxide binder may contain an oxide superacid compound. The oxide superacid compound may contain an oxide of element X and an oxide of element Y. The element X is at least one element selected from the group consisting of Titanium, Zirconium, Silicon, Tin, Hafnium, Germanium, Gallium, In, Cerium, Niobium and Aluminium, and the element Y is at least one element selected from the group consisting of Tungsten, Molybdenum, Chromium, Boron and Vanadium.

According other aspects of the present invention, a membrane electrode composite and a fuel cell comprising one of the electrodes are provided.

For purposes of summarizing the several aspects of the present invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage of group of advantages as taught herein without necessarily achieving other advantages as may be taught or suggested herein.

BRIEF DESCRIPTION OF THE SEVERAL VIEWS OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
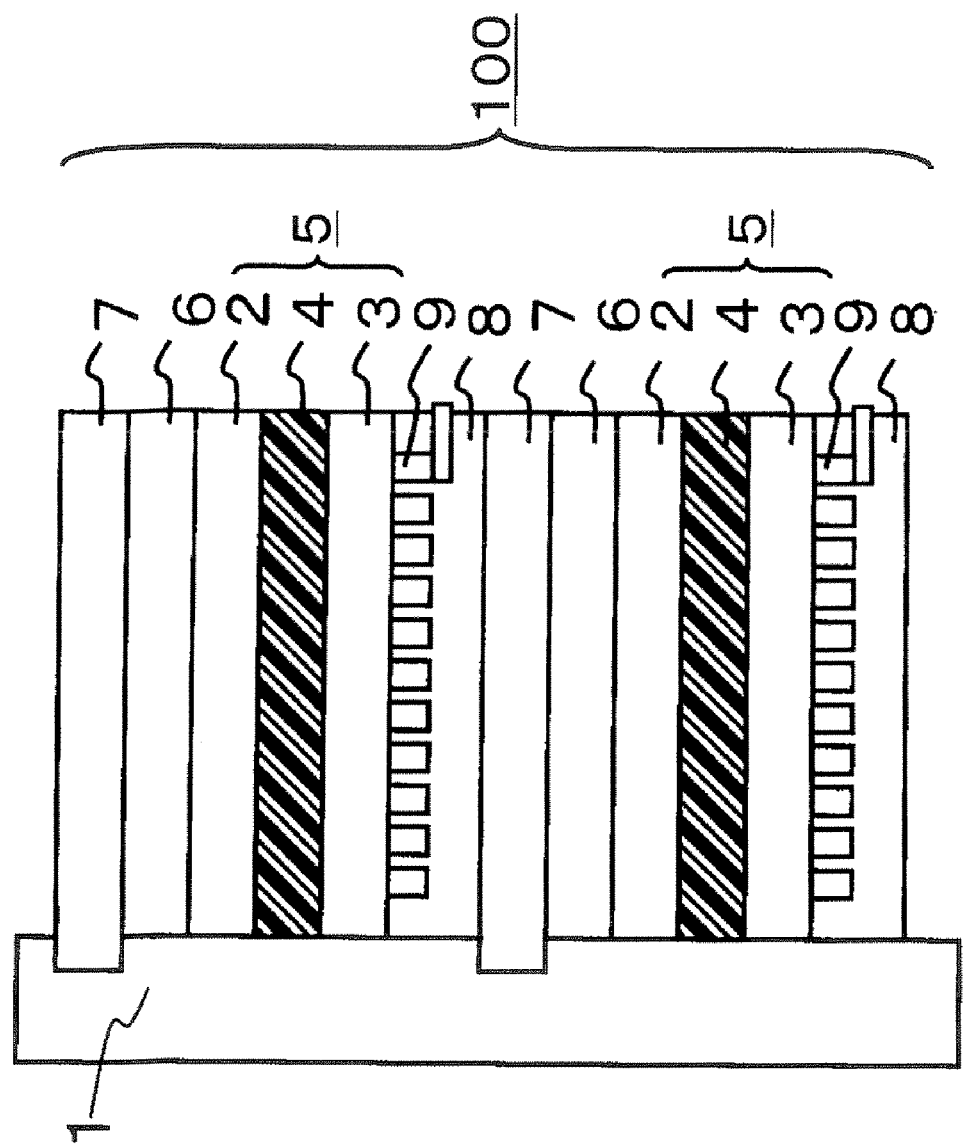
FIG. 1 is an exemplary schematic cross sectional view showing a liquid fuel cell according to one aspect of a fuel cell of the invention.

Referring now to the drawings, wherein like reference numerals designate identical or corresponding parts throughout the several views, various embodiments of the present invention will be described.

First Embodiment

An electrode for a fuel cell according to a first embodiment of the invention will be described.

An electrode for a fuel cell of this embodiment has a catalyst layer containing a proton conductive inorganic oxide and a reduction-oxidation catalyst. The catalyst layer mainly functions as a catalytic reaction field for a reduction-oxidation reaction of a fuel and an oxidant in an electrode. The catalyst layer also functions as a pass for protons and electrons formed and consumed in the reduction-oxidation reaction.

The catalyst layer of this embodiment has an inorganic mixed oxide as a proton conductive material. The inorganic mixed oxide contains an oxide containing element X, which is at least one element selected from the group consisting of Titanium, Zirconium, Silicon, Tin, Hafnium, Germanium, Gallium, Indium, Cerium, Niobium and Aluminium, and element Y, which is at least one element selected from the group consisting of Tungsten, Molybdenum, Chromium, Boron and Vanadium. The mixed oxide of element X and element Y is a superacid.

While the precise proton conductive mechanism of a proton conductive inorganic oxide has not yet been completely clear, it is considered that an oxide containing the element X (hereinafter, referred to as oxide A) and the oxide containing the element Y (hereinafter, referred to as oxide B) are chemically bonded to form a Lewis acid site in the structure of the oxide B, and the Lewis acid site is hydrated to form a Bronsted acid site, whereby a conduction field of protons is formed. In the case where the proton conductive inorganic oxide has an amorphous structure, it is considered that the structure accelerates the formation of the Lewis acid site In addition to the proton forming reaction at the Lewis acid site, the proton conductive inorganic oxide can also reduce the number of molecules of entrainment water required for proton conductivity, whereby high proton conductivity can be obtained with a small amount of water molecules present on the surface of the proton conductive inorganic oxide, and thus a larger amount electricity can be obtained without strict management of water upon electric power generation. It is considered that the aforementioned proton conductive mechanism is obtained with the oxide superacid compound using the aforementioned elements X and Y.

U.S. patent application Ser. No. 11/184,945 discloses an electrode for an fuel cell which comprises an oxide carrier, oxide particles formed on the oxide carrier, and a polymer binder. An example material of the oxide of the carrier is Tiox and an example material of the oxide particles is WOx. The electrode disclosed in the prior patent application is preferable for a water control and is expected to keep ion conductivity in atmosphere from room temperature to around 150 centigrade.

There may be preferable combination of element X and element Y, where element X is selected from the group consisting of Ti, Zr and Sn and element Y is selected from the group consisting of Mo and W.

The mixture of the oxides of Titanium and TUNGSTEN (oxide superacid: proton-conductive solid electrolyte), reduction-oxidation catalyst, the oxidation-reduction catalyst, and the polymer binder form an electrolyte. However, the polymer binder may terminate the proton passes formed by series of the proton conductive solid electrolyte and/or series of the oxide-reduction catalysts. Also, polymer binder may formed on the surfaces of proton conductive electrolyte and oxidation-reduction catalyst, thereby the superacid may receive small mass of mater which is less than a substantial production of proton. The reduction-oxidation catalyst may also receive small amount of fuel, whereby three phase interface for electrode reaction may reduces.

The embodiments of the present invention may attain a stable output from around room temperature and to around 150 centigrade and higher proton conductivity. The catalyst layer of this embodiment is contained in at least one of a fuel electrode and an oxidant electrode, whereby a cell resistance can be reduced, and the maximum electricity generated of a fuel cell can be increased.

The oxide B has water solubility while its solubility varies depending on the element and the pH condition. When the oxide A having low water solubility and the oxide B are heated to form chemical bonding, dissolution of the oxide B in water can be suppressed, and the proton conductive inorganic oxide can be improved in stability to water and a liquid fuel.

Furthermore, contamination of other fuel cell materials and apparatus due to ions of particles of the oxide B dissolved can be avoided. Therefore, according to the embodiment, the fuel cell can be improved in long term stability. Moreover, the oxide A, which is inexpensive, is used as a mother material, whereby the production cost of the cell can be reduced.

The chemical bonding of the oxide A and the oxide B can be confirmed, for example, by instrumental analysis, such as X-ray diffraction (XRD), electron probe microanalysis (EPMA), X-ray photoelectron spectroscopy (XPS), energy dispersive X-ray analysis (EDX) and transmission electron microscope (TEM).

It is sufficient that in the proton conductive inorganic oxide of this embodiment, the oxide A and the oxide B are chemically bonded, and the crystallinity of the oxide A and the oxide B is not particularly limited. In consideration of the acceleration of formation of Lewis acid site, the possibility of contribution to improvement in acidity, reduction in production cost, and the facility of the production process, it is preferred that the oxide B is an amorphous material, and it is more preferred that the oxide B is an amorphous material and the oxide A is a crystalline material. However, as contrary to the above, it is possible that the oxide A and the oxide B, both of which are in crystalline form, can be used, and the oxide B in crystalline form and the oxide A in amorphous form can be used.

In the case where the ratio of the element X of the oxide A and the element Y of the oxide B (Y/X) is less than 0.0001, there is such a possibility that the proton conductivity is lowered due to shortage of the proton conductive field. In the case where the element ratio (Y/X) exceeds 5, there is such a possibility that the proton conductivity is lowered because the proton conductive field is hidden by the particles of the oxide B containing the element Y. Therefore, the element ratio (Y/X) of the oxide A and the element Y of the oxide B is preferably in a range of from 0.0001 to 5, and more preferably from 0.01 to 1.

The proton conductive inorganic oxide of this embodiment can be utilized as an inorganic binder having proton conductive capability by heat-treating a precursor homogeneous solution containing those elements that constitute the oxide. A solution containing the element X and the element Y constituting the proton conductive inorganic oxide is prepared to have a target composition of the mixture of the oxide A and the oxide B, and the solution is dried to deposit a precursor of the oxide A and the oxide B, which is then heated. Consequently, the oxide A and the oxide B are chemically bonded, and simultaneously, the reduction-oxidation catalyst material can be bound. The precursor homogeneous solution containing the element X and the element Y can be prepared by using, as raw materials, an aqueous solution of a chloride, a nitrate or an oxo acid salt of the constitutional elements, or an alcohol solution of a metal alkoxide.

The proton conductive inorganic oxide of this embodiment can be utilized as an inorganic binder having proton conductive capability by heat-treating the precursor homogeneous solution containing those elements X, Y that constitute the oxide. In the case where the treating temperature is lower than 200° C., there is such a possibility that the oxide A and the oxide B cannot be chemically bonded to each other sufficiently to decrease the proton conductivity of the resulting oxide. Furthermore, there is such a possibility that the binding capability as the binder is low, whereby the molded article obtained cannot be used practically. In the case where the treating temperature is a high temperature exceeding 1,000° C., on the other hand, there is such a possibility that particles are fused to each other to reduce the surface area to fail to obtain high proton conductivity. Furthermore, there is such a possibility that the molded article is broken due to stress caused by large volume contraction. The heat-treating temperature is preferably from 200 to 1,000° C., and more preferably from 400 to 700° C. At a temperature of 200° C., the oxide A and the oxide B are difficult to form chemical bonding due to the low temperature, and it is necessary that the heat treatment is carried out for a long period of time. A high heat-treating temperature near 1,000° C. facilitates formation of chemical bond, and thus the oxide can be synthesized by the heat treatment for a short period of time.

The proton conductive inorganic oxide of this embodiment preferably exhibits solid superacidity. The dissociation degree of protons can be expressed as an acid strength, and the acid strength of a solid acid is expressed as an acidity function of Hammett $H_0$, which is −11.93 for sulfuric acid. The proton conductive inorganic oxide more preferably exhibits solid superacidity of $H_0 < -11.93$. The acidity of the oxide superacid compound of this embodiment can be increased to $H_0 = -20.00$ by optimizing the synthesis method thereof. Accordingly, the acid strength of the superacid is preferably in a range of $-20.00 < H_0 < -11.93$.

The electrode for a fuel cell of this embodiment has a catalyst layer containing a proton conductive inorganic oxide and a reduction-oxidation catalyst, and used as at least one of a fuel electrode and an oxidant electrode of a fuel cell.

The fuel electrode and the oxidant electrode each is formed of a gas-diffusion structure, such as a porous body, through which a fuel gas or a liquid fuel and an oxidant gas can be transmitted. A metal catalyst carried on an electron conductive catalyst carrier, such as carbon, is used in the fuel electrode to accelerate the oxidation reaction of the fuel, and is used in the oxidant electrode to accelerate the reduction reaction of oxygen. Examples of the metal catalyst include platinum, gold, silver, palladium, iridium, rhodium, ruthenium, iron, cobalt, nickel, chromium, tungsten, molybdenum, manganese and vanadium, which may be used as an elemental substance or a multi-component alloy. In particular, platinum is often used owing to the high catalytic activity thereof. It is sufficient that the carrier for carrying the metal catalyst has electron conductivity, and a carbon material is often used. Examples thereof include carbon black, such as furnace black, channel black and acetylene black, activated carbon, and graphite.

The method for carrying the metal catalyst on a catalyst support, such as carbon, is not particularly limited. Examples of the carrying method include the following method. A carbon compound is dispersed in a solution of a substance containing a metallic element to be a catalyst, such as an aqueous solution of a chloride, a nitrate or an oxo acid salt, or an alcohol solution of a metal alkoxide, and then the solvent is removed to place the metal catalyst particles on the surface of the catalyst carrier. The carrier is then heat-treated under a reducing atmosphere to support the metal catalyst on the catalyst carrier. The particle diameter of the catalyst metal is generally from 1 to 50 nm, and the amount of the catalyst metal is generally from 0.01 to 10 mg/cm² in the state of an electrode.

The proton conductive inorganic oxide preferably has continuity since it functions as a path for transporting protons. Accordingly, the proton conductive inorganic oxide is preferably in a form of a continuous film in contact as a plane with a part of the surface of the metallic salt to cover the metal catalyst. In the case where the proton conductive inorganic oxide is formed as a film covering a part of the surface of the metal catalyst, the transmission of protons can be accelerated in comparison to the case where the oxide particles and the catalyst are in point contact with each other, whereby the reduction-oxidation reaction can be accelerated.

The proton conductive inorganic oxide can be used as an inorganic binder for binding a reduction-oxidation catalyst or an electron conductive carrier having the catalyst carried thereon. It is preferred in this case that the metal catalyst or the inorganic oxide preferably forms a continuous electron conductive path or a continuous proton conductive path. It is considered that according to the constitution, the conductivity of protons and electrons can be improved.

In the case where the content of the proton conductive inorganic oxide is less than 0.5 weight % based on the total weight of the catalyst layer as 100 weight %, the binding capability and the proton conductivity of the catalyst layer cannot be sufficiently obtained. In the case where the content exceeds 60 weight %, the binding capability and the proton conductivity of the catalyst layer can be attained, but the continuity of the reduction-oxidation metal catalyst or the carrier carrying the metal catalyst is impaired, thus failing to ensure sufficient electron conductivity of the catalyst layer. Furthermore, in the case where the whole surface of the catalyst is densely covered with the proton conductive inorganic oxide, the reactant is difficult to be fed to the catalyst, which impairs the catalyst reaction, and thus stable electric power generation is impaired. Therefore, the content of the proton conductive inorganic oxide is preferably not less than 0.5 weight % and not more than 60 weight %, and more preferably not less than 1 weight % and not more than 50 weight %, based on the total weight of the catalyst layer as 100 weight %.

The electrode may be constituted solely by the catalyst layer or may be constituted by forming the catalyst layer on a support. The production process of the electrode is not particularly limited. For example, a precursor homogeneous solution containing the elements constituting the reduction-oxidation metal catalyst or the carrier carrying the reduction-oxidation metal catalyst and the proton conductive inorganic oxide binder is mixed and dispersed with water or an organic solvent, such as an alcohol, to form a slurry. The slurry is applied to a support, and the support with the slurry is then dried and heated to form the catalyst layer. In alternative, a catalyst layer containing only the metal catalyst or the carrier carrying the reduction-oxidation metal catalyst is formed on a support, and then the catalyst layer is impregnated with a precursor homogeneous solution containing the elements constituting the proton conductive inorganic oxide binder, and the catalyst layer is then dried and heated to form the catalyst layer.

Furthermore, the reduction-oxidation metal catalyst or the carrier carrying the reduction-oxidation metal catalyst is impregnated with a precursor homogeneous solution containing the elements constituting the proton conductive inorganic oxide binder, and is then dried and heated to form a film of the proton conductive inorganic oxide on the surface of the reduction-oxidation metal catalyst or the carrier carrying the reduction-oxidation metal catalyst. Thereafter, a precursor homogeneous solution containing the proton conductive inorganic oxide binder is mixed and dispersed with water or an organic solvent, such as an alcohol, to form a slurry. The slurry is applied to a support, and the support with the slurry is then dried and heated to form the catalyst layer.

Moreover, the reduction-oxidation metal catalyst or the carrier carrying the reduction-oxidation metal catalyst is impregnated with a precursor homogeneous solution containing the elements constituting the proton conductive inorganic oxide binder, and is then dried and heated to form a film of the proton conductive inorganic oxide on the surface of the reduction-oxidation metal catalyst or the carrier carrying the reduction-oxidation metal catalyst. Thereafter, a catalyst layer containing only the catalyst is formed and then impregnated with a precursor homogeneous solution containing the proton conductive inorganic oxide binder, and the catalyst layer is dried and heated to complete the catalyst layer.

The support is not particularly limited, and for example, an electrolyte membrane is used as the support, on which the catalyst layer is formed to produce a membrane electrode composite. In alternative, the catalyst layer is formed on paper, felt or cloth made of carbon having gas permeability and electron conductivity, which is bound with an electrolyte membrane to produce a membrane electrode composite.

In the electrode catalyst layer containing the reduction-oxidation metal catalyst or the carrier carrying the reduction-oxidation metal catalyst and the proton conductive inorganic oxide, the binding capability and the proton conductivity of the catalyst layer are somewhat lowered when the thickness of the proton conductive inorganic oxide coat covering the reduction-oxidation metal catalyst or the carrier carrying the reduction-oxidation metal catalyst is less than 1 nm. In the case where the thickness exceeds 500 nm, the binding capability and the proton conductivity of the catalyst layer can be sufficiently retained, but the continuity of the reduction-oxidation metal catalyst or the carrier carrying the metal catalyst is impaired, thus failing to ensure sufficient electron conductivity of the catalyst layer. Furthermore, in the case where the whole surface of the catalyst is densely covered with the proton conductive inorganic oxide, oxidation reaction of the fuel is difficult to proceed, and thus stable electric power generation is impaired. Therefore, the thickness of the proton conductive inorganic oxide binder layer covering the surface of the reduction-oxidation metal catalyst or the carrier carrying the reduction-oxidation metal catalyst is preferably not less than 1 nm and not more than 500 nm, and more preferably not less than 3 nm and not more than 300 nm. The thickness of the proton conductive inorganic oxide binder layer covering the surface of the reduction-oxidation metal catalyst or the carrier carrying the reduction-oxidation metal catalyst can be measured by instrumental analysis, such as a transmission electron microscope (TEM).

The proton conductive inorganic oxide coat is formed by drying and heating the precursor homogeneous solution containing the elements constituting the proton conductive inorganic oxide binder. Upon heating, the crystalline structure of the oxide is changed associated with increase in crystallinity and the like, whereby the proton conductive inorganic oxide coat receives stress. The increase in crystallinity and the formation of stress in the proton conductive inorganic oxide coat bring about formation of fine particles of the film and decrease in binding capability with the reduction-oxidation metal catalyst or the carrier carrying the reduction-oxidation metal catalyst. In order to solve the problem, it is effective to incorporate, as the third component, oxide C containing element Z being at least one element selected from the group consisting of Yttrium, Scandium, Lanthanum, Samarium, Gadolinium, Magnesium, Calcium, Strontium and Barium, as a structure stabilizer for the proton conductive inorganic oxide coat. The effect of the oxide C containing the element Z is insufficient when the content thereof is less than 0.01 mol % in the composition of the proton conductive inorganic oxide. In the case where the content exceeds 40 mol %, the proton conductivity is decreased. Therefore, the content of the oxide C is preferably not less than 0.01 mol % and not more than 40 mol %, and more preferably not less than 0.1 mol % and not more than 10 mol %.

The catalyst layer and the electrode containing the proton conductive inorganic oxide and the reduction-oxidation metal catalyst or the carrier carrying the reduction-oxidation metal catalyst may contain a water repellent or hydrophilic organic polymer for facilitating smooth circulation of substances inside the catalyst layer, such as supply of a fuel and an oxidant, and removal of gas and water generated upon electric power generation. Examples of the water repellent organic polymer include a fluorine-containing polymer and an aromatic polymer. Specific examples thereof include polytetrafluoroethylene, a tetrafluoroethylene-hexafluoropropylene copolymer (FEP), a tetrafluoroethylene-perfluoroalkyl vinyl ether copolymer (PFA), polyvinylidene fluoride, polystyrene, polysulfone and polyether polyketone. The hydrophilic polymer herein means an organic polymer having an equilibrium water absorption coefficient of 5% or more at 20° C., and has in the polymer structure, for example, a hydroxyl group, a carboxyl group, an ether bond, an amide bond or an ester bond. Specific examples of the hydrophilic polymer include polyvinyl alcohol, polyacrylic acid, polyacrylate ester, polyvinylpyrrolidone, polyethylene glycol, polyamide, polyester and polyvinyl acetate.

The water repellency and the hydrophilicity of the catalyst layer and the electrode can be modified by the following methods. For example, a solution obtained by dissolving or dispersing an organic polymer is mixed with a catalyst layer slurry containing the precursor homogeneous solution containing the elements constituting the proton conductive inorganic oxide, and the reduction-oxidation metal catalyst or the carrier carrying the reduction-oxidation metal catalyst. The resulting catalyst layer slurry is coated on a support, and the support with the slurry is dried and heated to form a catalyst layer, whereby a modified electrode is produced. In alternative, a catalyst layer slurry containing the precursor homogeneous solution containing the elements constituting the proton conductive inorganic oxide, and the reduction-oxidation metal catalyst or the carrier carrying the reduction-oxidation metal catalyst is coated on a support, and the support with the slurry is dried and heated to form a catalyst layer, whereby an electrode is produced. The electrode thus produced is impregnated with a solution obtained by dissolving or dispersing an organic polymer, and the electrode is dried and heated to obtain a modified electrode.

A water repellent or hydrophilic material other than the organic polymer may be used as a material for modifying the catalyst layer or the electrode. Examples of the water repellent material include hydrophobic silica obtained by modifying a surface of silicon oxide $SiO_2$ with a trimethylsilyl group (for example, RX200, produced by Nippon Aerosil Co., Ltd.). Examples of the hydrophilic material include silicon oxide $SiO_2$ and titanium oxide $TiO_2$ subjected to a superhydrophilic treatment by irradiating with an ultraviolet ray.

It is preferred that the water repellency and the hydrophilicity of the catalyst layer and the electrode are modified while maintaining the proton conductivity and the electron conductivity of the catalyst layer at a high level. The content of the water repellent or hydrophilic organic polymer is preferably in a range of from 0 to 30 weight % based on the total weight of the electrode as 100 weight %.

The heat-treating temperature for heating the organic polymer for modifying the water repellency and the hydrophilicity of the catalyst layer and the electrode may be about 200° C. or less in consideration of the decomposition temperature of the hydrocarbon organic polymer. However, the organic polymer having a high decomposition temperature, such as a fluorine organic polymer, can withstand a heat treatment at 400° C. or lower.

According to this embodiment having been described hereinabove, a fuel cell can be driven at from room temperature to a high temperature around 150° C., and the proton conductivity in the electrode can be improved.

Second Embodiment

A second embodiment of the invention relates to a membrane electrode composite having a fuel electrode, an oxidant electrode, and an electrolyte membrane disposed between the fuel electrode and the oxidant electrode. At least one electrode of the fuel electrode and the oxidant electrode contains a catalyst layer, the constitutions and advantages of which are the same as in the first embodiment.

The electrolyte membrane is not particularly limited, and examples thereof include a perfluorosulfonic acid-containing polymer electrolyte membrane (for example, Nafion, a trade name, produced by Du Pont, Inc.). A proton conductive solid electrolyte membrane formed by adding an oxide superacid compound to an organic polymer may also be used since stable output can be obtained at a high temperature.

The oxide superacid compound contained in the organic polymer contains a proton conductive inorganic oxide containing an oxide carrier containing element X being at least one element selected from the group consisting of Titanium, Zirconium, Silicon, Tin, Hafnium, Germanium, Gallium, Indium, Cerium, Niobium and Aluminium, and oxide particles containing element Y being at least one element selected from the group consisting of Tungsten, Molybdenum, Chromium, Boron and Vanadium.

In the case where the ratio of the element X of the oxide A and the element Y of the oxide B (Y/X) is less than 0.0001, there is such a possibility that the proton conductivity is lowered due to shortage of the proton conductive field. In the case where the element ratio (Y/X) exceeds 5, there is such a possibility that the proton conductivity is lowered because the proton conductive field is hidden by the particles of the oxide B containing the element Y. Therefore, the element ratio (Y/X) of the oxide A and the element Y of the oxide B is preferably in a range of from 0.0001 to 5, and more preferably from 0.01 to 1.

The proton conductive inorganic oxide can be obtained by heating oxides of two different kinds to form chemical bond. There is such a possibility in the heating step that the bond is released by forming stress due to heat between the different oxides. In order to solve the problem, it is effective to incorporate, as the third component, oxide C containing element Z being at least one element selected from the group consisting of Yttrium, Scandium, Lanthanum, Samarium, Gadolinium, Magnesium, Calcium, Strontium and Barium, as a structure stabilizer for the proton conductive inorganic oxide coat. The effect of the oxide C containing the element Z is insufficient when the content thereof is less than 0.01 mol % in the composition of the proton conductive inorganic oxide. In the case where the content exceeds 40 mol %, the proton conductivity is decreased. Therefore, the content of the oxide C is preferably not less than 0.01 mol % and not more than 40 mol %, and more preferably not less than 0.1 mol % and not more than 10 mol %.

The organic polymer is not particularly limited, and specific examples thereof include polystyrene, polyether ketone, polyether ether ketone, polysulfone, polyether sulfone and other engineering plastics. Materials obtained by doping or chemically bonding and fixing sulfonic acid, phosphoric acid or other proton carriers to the aforementioned organic polymers may be used. Among these, polyacrylonitrile (PAN) is preferred owing to the high polarity thereof.

The oxide superacid compound exhibits a function of a proton conductor in the case where water is present on the surface. In the case where a hydrophilic organic polymer is used as a polymer containing the oxide superacid compound, a sufficient amount of water can be fed to the oxide superacid compound to realize a proton conductive solid electrolyte having high proton conductivity. The hydrophilic polymer herein means an organic polymer having an equilibrium water absorption coefficient of 5% or more at 20° C. or higher, and has in the polymer structure, for example, a hydroxyl group, a carboxyl group, an ether bond, an amide bond or an ester bond. Specific examples of the hydrophilic polymer include polyvinyl alcohol, polyacrylic acid, polyacrylate ester, polyvinylpyrrolidone, polyethylene glycol, polyamide, polyester and polyvinyl acetate. The equilibrium water absorption coefficient is measured in the following manner. A sample membrane is allowed to stand for a week in a hygrostatic and thermostatic chamber adjusted to have a temperature of 20° C. or higher and a relative humidity of 95% or higher to obtain equilibrium condition in water absorption, and the weight of the sample is measured. The sample is dried at 150° C. for 2 hours, and the weight of the dried sample is measured. The difference in weight between the sample in the equilibrium state and the dried sample is designated as the equilibrium water absorption coefficient. In the proton conductive solid electrolyte membrane, the mixing ratio of the proton conductive inorganic oxide and the organic polymer preferably satisfies such conditions that transmission of a liquid fuel is prevented while maintaining the high proton conductivity. In the case where the weight ratio (S/T) of the proton conductive inorganic oxide (S) to the total weight of the membrane (T) is less than 0.1, there is a possibility of impairing the continuity of the proton conductive inorganic oxide to decrease the conductivity, and therefore, the weight ratio (S/T) is preferably in a range of from 0.1 to 0.999.

The proton conductive solid electrolyte is produced in the following manner. A slurry containing an organic polymer solution having the proton conductive inorganic oxide and an organic polymer dissolved and dispersed therein is prepared. The slurry is cast and dried on a glass substrate or a resin substrate and then dried for removing the solvent, and the substrate with the dried slurry is subjected to a heat treatment to produce the proton conductive solid electrolyte. The heat-treating temperature may be about 200° C. or less in consideration of the decomposition temperature of the hydrocarbon organic polymer. However, the organic polymer having a high decomposition temperature, such as a fluorine organic polymer, can withstand a heat treatment at 400° C. or lower. While the detailed mechanisms are still not clear, it is expected that in the case where a hydrophilic organic polymer is used as the material for the electrolyte membrane, the proton conductive inorganic oxide and the hydrophilic organic polymer undergo oxidation reaction, dehydration reaction, mutual interaction with a hydrogen bond, or crystallization of the hydrophilic organic polymer, through the heat treatment at 200° C. or lower, whereby the hydrophilic organic polymer is prevented from being swelled or dissolved. With respect at least to polyvinyl alcohol, it is suggested from results of infrared spectrometric analysis (IR) that a hydroxyl group as a hydrophilic group in polyvinyl alcohol is oxidized by the heat treatment at 200° C. or lower with a solid superacid, so as to form a ketone group having hydrophobic nature.

The heat-treating temperature is necessarily such a temperature that the organic polymer does not undergo decomposition or deterioration, and it is preferred that the heat treatment is effected at a temperature of 200° C. or lower.

In the case where the proton conductive solid electrolyte is used as a solid electrolyte of a fuel cell, it is generally used in the form of a membrane, but it is not limited thereto and may be used in the form, for example, of a cylinder. That is, the following methods may be employed. A dispersion mixture of the proton conductive inorganic oxide and the hydrophilic organic polymer is cast directly into a membrane form, or the dispersion mixture is cast by impregnation with woven cloth or nonwoven cloth.

The proton conductive solid electrolyte membrane is not particularly limited in thickness, and the thickness thereof is preferably not less than 10 μm for obtaining a membrane capable of withstanding practical application including strength, transmission of a liquid fuel, and proton conductivity, and is preferably not more than 300 μm for reducing the membrane resistance. Particularly, in order to reduce the internal resistance of the fuel cell, the thickness is preferably from 10 to 100 μm.

In order to control the thickness of the membrane with the dispersion mixture of the proton conductive inorganic oxide and the hydrophilic organic polymer cast directly into a membrane form, the thickness of the membrane can be changed in such manners that the amount or the cast area of the dispersion mixture of the proton conductive inorganic oxide and the hydrophilic organic polymer is changed, or the completed membrane is applied with heat and pressure with a hot-pressing machine to reduce the thickness, while it is not limited to these methods.

The electrolyte membrane and the electrode can be bonded by using an apparatus capable of applying heat and pressure. In general, a hot-pressing machine is employed. The pressing temperature may be a temperature higher than the glass transition temperature of the polymer used in the electrolyte membrane and is generally from 100 to 400° C. The pressing pressure depends on the hardness of the electrode and is generally from 5 to 200 kg/cm$^2$.

According to the membrane electrode composite of this embodiment, a fuel cell can be driven at from room temperature to a high temperature around 150° C., and the proton conductivity and the electron conductivity in the electrode can be improved. In particular, protons and electrons can be moved at high rates by using the oxide superacid compound in the fuel electrode, the electrolyte membrane and the oxidant electrode.

Third Embodiment

A fuel cell having a membrane electrode composite according to a third embodiment of the invention will be described with reference to FIG. 1.

FIG. 1 is a schematic cross sectional view showing a liquid fuel cell according to the third embodiment. A fuel cell stack 100 is formed by stacking two single cells. The number of cells to be stacked may be 3 or more. A fuel feeding path 1 is disposed on the side surface of the stack 100. The fuel feeding path 1 is fed with a liquid fuel from a liquid fuel tank (not shown in the figure) through a feeding tube (not shown in the figure) Each of the single cells has a membrane electrode composite (electrogenic part) 5 constituted by a fuel electrode (anode) 2, an oxidant electrode (cathode) 3 and an electrolyte membrane 4 disposed between the fuel electrode 2 and the oxidant electrode 3. The fuel electrode 2 and the oxidant electrode 3 are preferably formed with a conductive porous material for passing the fuel or oxidant and also electrons.

Each of the single cells further has a fuel vaporizing part 6 accumulated on the fuel electrode 2, a fuel penetrating part 7 accumulated on the fuel vaporizing part 6, and a cathode separator 8 accumulated on the oxidant electrode 3. The fuel penetrating part 7 has a function of retaining the liquid fuel. The liquid fuel is fed from the fuel feeding path 1. The fuel vaporizing part 6 a function of guiding a vaporized component of the liquid fuel retained by the fuel penetrating part 7 to the fuel electrode 2. Oxidant gas feeding grooves 9 in the form of continuous grooves for flowing the oxidant gas are provided on a surface of the cathode separator 8 facing the oxidant electrode 3. The grooves 9 are parallel grooves extending in the direction perpendicular to paper. Water formed through electric power generation is exhausted from the electrogenic part through the grooves 9. The cathode separator 8 also has a function of electrically connecting the adjacent electrogenic parts in series.

In the case where the stack 100 is constituted by stacking single cells as shown in FIG. 1, the cathode separator 8, the fuel penetrating part 7 and the fuel vaporizing part 6 are preferably formed of an electroconductive material, such as a porous material containing carbon or a metal, since these members also function as a collector plate.

As having been described, the oxidant gas feeding grooves 9 of the cathode separator of the stack shown in FIG. 1 also have a function of a channel for feeding the oxidant gas. By using such a member 8 that has both functions of a separator and a member for forming a channel (hereinafter, referred to as a channel-separator member), the number of members can be reduced to miniaturize the fuel cell. In alternative, a separator 8 and a channel may be separately provided instead of the channel-separator member 8.

Examples of the method for feeding the liquid fuel from a fuel storage tank (not shown in the figure) to the liquid fuel feeding path 1 include a method of feeding the liquid fuel stored in the fuel storage tank to the liquid fuel feeding path 1 by free fall. This method has a constitutional restriction that the fuel storage tank is necessarily provided at a position higher than the stack 100, but the liquid fuel can be fed reliably to the liquid fuel feeding path 1. Examples of the method also include a method of drawing the liquid fuel from the fuel storage tank with capillary force of the liquid fuel feeding path 1. In the case where this method is employed, there is no necessity that the position of the connecting part of the fuel storage tank and the liquid fuel feeding part 1, i.e., the fuel inlet port provided on the liquid fuel feeding path 1, may not be provided at a position higher than the upper surface of the stack 100. Therefore, by combining this method with the free fall method, such an advantage can be obtained, for example, that the installation location of the fuel tank can be freely selected.

In this case, in order that the liquid fuel, which has been fed to the liquid fuel feeding part 1 with capillary force, is further fed smoothly to the fuel penetrating part 7 with capillary force, it is desired that the capillary force of the fuel penetrating part 7 is larger than the capillary force of the liquid fuel feeding path 1. The number of the liquid fuel feeding path 1 is not limited to only one that is provided along the side surface of the stack 100, and another one of the liquid fuel feeding path 1 may be provided on the other side surface of the stack 100.

The fuel storage tank described above may be constituted as being detached from the main body of the cell. According to the constitution, the call can be continuously driven for a long period of time by exchanging the liquid fuel storage tank. The liquid fuel may be fed from the fuel storage tank to the liquid fuel feeding path 1 by such a constitution that the liquid fuel is pushed out by free fall or the internal pressure of the tank, or such a constitution that the fuel cell is drawing with capillary force of the liquid fuel feeding path 1.

The liquid fuel thus fed to the liquid fuel feeding part 1 in the aforementioned manner is fed to the fuel penetrating part 7. The fuel penetrating part 7 is not limited in structure as long as it has such a function that the liquid fuel can be retained therein, and only the vaporized fuel can be fed to the fuel electrode 2 through the fuel vaporizing part 6. For example, it may have a path for the liquid fuel, and a gas-liquid separation membrane at the interface to the fuel vaporizing part 6. In the case where the liquid fuel is fed to the fuel penetrating part 7 with capillary force without using an auxiliary device, the fuel penetrating part 7 is not limited in structure as long as it can be penetrated with the liquid fuel with capillary force. Examples thereof include a porous material formed with particles or filler, nonwoven fabric produced by paper making method, woven cloth obtained by weaving fibers, and a small gap formed between glass or plastic plates.

The case where a porous material is used as the fuel penetrating part 7 is described herein. The capillary force for drawing the liquid fuel to the fuel penetrating part 7 includes capillary force of the porous material itself constituting the fuel penetrating part 7. In the case where the capillary force of the porous material is utilized, the pores of the porous material of the fuel penetrating part 7 are formed as continuous pores having a controlled pore size that continue from the side surface of the fuel penetrating part 7 on the side of the liquid fuel feeding path 1 to at least the other surface of the fuel penetrating part 7, whereby the liquid fuel can be fed smoothly in the horizontal direction with capillary force.

Such characteristics as pore diameter of the porous material used as the fuel penetrating part 7 are not particularly limited as long as the liquid fuel in the liquid fuel feeding path 1 can be drawn, and in consideration of the capillary force of the liquid fuel feeding path 1, the pore diameter is preferably not less than about 0.01 µm and not more than about 150 µm. The pore volume, which may be an index of continuity of pores in a porous material, thereof is preferably not less than about 20% and not more than about 90%. In the case where the pore size is less than about 0.01 µm, there are cases where production of the fuel penetrating part 7 becomes difficult, and in the case where it exceeds about 150 µm, there are cases where the capillary force is decreased. In the case where the pore volume is less than about 20%, there are cases where the amount of continuous pores is decreased but the amount of closed pores is increased, whereby sufficient capillary force cannot be obtained. In the case where pore volume exceeds about 90%, on the other hand, there are cases where the strength of the fuel penetrating part 7 is lowered and the production thereof becomes difficult while the amount of continuous pores is increased. In practical standpoint, the porous material constituting the fuel penetrating part 7 preferably has a pore diameter of not less than 0.5 µm and not more than 100 µm, and a pore volume of not less than 30% and not more than 70%.

The fuel cell having been described can perform cell reaction at room temperature or higher, but it is preferably driven at a higher temperature of from 50 to 150° C. since the catalytic activity of the electrodes is improved to decrease the electrode overcurrent. Furthermore, it is preferred to drive the cell at a temperature, at which the water content can be easily controlled, for exerting sufficiently the proton conductivity of the proton conductive binder of the electrode catalyst layer. The driving temperature of the fuel cell is preferably in a range of from room temperature to 150° C.

According to this embodiment, a fuel cell can stably perform power generation at from room temperature to a high temperature around 150° C., and the output power of the fuel cell can be improved by increasing the proton conductivity in the electrodes.

EXAMPLE

The invention will be described with reference to the following specific but non-limiting examples.

Example 1

50 mL of distilled water having 0.7 g of vanadium chloride $VCl_3$ dissolved therein was mixed with 50 mL of an ethanol solution having 9 g of tetraethoxysilane $(C_2H_5O)_4Si$ dissolved therein to prepare a precursor solution of an oxide superacid compound. The solution was prepared to have an element ratio (Y/X) of vanadium element (Y) of vanadium oxide and silicon element (X) of silicon oxide of 0.1. The solution was prepared also to have a solid content of an oxide superacid compound after drying and heating of 3% based on the mixed solvent of water and ethanol.

0.5 g of 10% Pt supporting carbon powder was mixed with 4 g of the precursor solution of an oxide superacid compound prepared in the preceding step, 1 g of water and 1 g of ethanol. The mixture was placed in an airtight vessel along with zirconia balls, which were mixed with a bench ball mill for 6 hours to prepare a cathode catalyst slurry.

The slurry was applied to carbon paper and dried at 60° C. for 1 hour. The resulting electrode was heated in a nitrogen stream at 600° C. for 4 hours to form a cathode. The cathode had a catalyst layer having a thickness of 50 μm, and had a Pt catalyst amount of 4 mg/cm$^2$ and a content of the oxide superacid compound of 20% based on the total weight of the catalyst layer.

0.5 g of 10% Pt—Ru supporting carbon powder was mixed with 4 g of the precursor solution of an oxide superacid compound prepared in the preceding step, 1 g of water and 1 g of ethanol. The mixture was placed in an airtight vessel along with zirconia balls, which were mixed with a bench ball mill for 6 hours to prepare an anode catalyst slurry. The slurry was applied to carbon paper and dried at 60° C. for 1 hour. The resulting electrode was heated in a nitrogen stream at 600° C. for 4 hours to form an anode. The anode had a catalyst layer having a thickness of 51 μm, and had a Pt—Ru catalyst amount of 4 mg/cm$^2$ and a content of the oxide superacid compound of 19% based on the total weight of the catalyst layer.

The oxide superacid compound binder synthesized in the anode and the cathode was a mixture of vanadium oxide and silicon oxide having an element ratio (Y/X) of vanadium element (Y) of vanadium oxide and silicon element (X) of silicon oxide of 0.1. The catalyst layer was released from the carbon paper and pulverized. The mixture of vanadium oxide and silicon oxide was subjected to an X-ray diffraction measurement. The measurement revealed that all the diffraction peaks observed were ascribed to silicon oxide, and thus it was confirmed that the vanadium oxide had an amorphous structure.

The element ratio (X/Y) of the proton conductive inorganic material powder was measured by the energy dispersive X-ray analysis (EDX), the X-ray electron spectroscopy (XPS) and the inductively coupled plasma atomic emission spectroscopy (ICP).

Example 2

50 mL of distilled water having 1.3 g of chromium chloride hexahydrate $CrCl_3.6H_2O$ dissolved therein was mixed with 50 mL of an ethanol solution having 9 g of tetraethoxysilane $(C_2H_5O)_4Si$ dissolved therein to prepare a precursor solution of an oxide superacid compound. The solution was prepared to have an element ratio (Y/X) of chromium element (Y) of chromium oxide and silicon element (X) of silicon oxide of 0.1. The solution was prepared also to have a solid content of an oxide superacid compound after drying and heating of 3% based on the mixed solvent of water and ethanol.

0.5 g of 10% Pt supporting carbon powder was mixed with 4 g of the precursor solution of an oxide superacid compound prepared in the preceding step, 1 g of water and 1 g of ethanol. The mixture was placed in an airtight vessel along with zirconia balls, which were mixed with a bench ball mill for 6 hours to prepare a cathode catalyst slurry. The slurry was applied to carbon paper and dried at 60° C. for 1 hour. The resulting electrode was heated in a nitrogen stream at 600° C. for 4 hours to form a cathode. The cathode had a catalyst layer having a thickness of 52 μm, and had a Pt catalyst amount of 4 mg/cm$^2$ and a content of the oxide superacid compound of 21% based on the total weight of the catalyst layer.

0.5 g of 10% Pt—Ru supporting carbon powder was mixed with 4 g of the precursor solution of an oxide superacid compound prepared in the preceding step, 1 g of water and 1 g of ethanol. The mixture was placed in an airtight vessel along with zirconia balls, which were mixed with a bench ball mill for 6 hours to prepare an anode catalyst slurry. The slurry was applied to carbon paper and dried at 60° C. for 1 hour. The resulting electrode was heated in a nitrogen stream at 600° C. for 4 hours to form an anode. The anode had a catalyst layer having a thickness of 53 μm, and had a Pt—Ru catalyst amount of 4 mg/cm$^2$ and a content of the oxide superacid compound of 20% based on the total weight of the catalyst layer.

The oxide superacid compound binder synthesized in the anode and the cathode was a mixture of chromium oxide and silicon oxide having an element ratio (Y/X) of chromium element (Y) of chromium oxide and silicon element (X) of silicon oxide of 0.1. The catalyst layer was released from the carbon paper and pulverized. The mixture of chromium oxide and silicon oxide was subjected to an X-ray diffraction measurement. The measurement revealed that all the diffraction peaks observed were ascribed to silicon oxide, and thus it was confirmed that the chromium oxide had an amorphous structure.

Example 3

50 mL of a 2% hydrochloric acid aqueous solution having 0.8 g of molybdic acid $H_2MoO_4$ dissolved therein was mixed with 60 mL of an ethanol solution having 9 g of tetraethoxysilane $(C_2H_5O)_4Si$ dissolved therein to prepare a precursor solution of an oxide superacid compound. The solution was prepared to have an element ratio (Y/X) of molybdenum element (Y) of molybdenum oxide and silicon element (X) of silicon oxide of 0.1. The solution was prepared also to have a solid content of an oxide superacid compound after drying and heating of 3% based on the mixed solvent of water and ethanol.

0.5 g of 10% Pt supporting carbon powder was mixed with 4 g of the precursor solution of an oxide superacid compound prepared in the preceding step, 1 g of water and 1 g of ethanol. The mixture was placed in an airtight vessel along with zirconia balls, which were mixed with a bench ball mill for 6 hours to prepare a cathode catalyst slurry. The slurry was applied to carbon paper and dried at 60° C. for 1 hour. The resulting electrode was heated in a nitrogen stream at 600° C. for 4 hours to form a cathode. The cathode had a catalyst layer having a thickness of 50 μm, and had a Pt catalyst amount of 4 mg/cm$^2$ and a content of the oxide superacid compound of 22% based on the total weight of the catalyst layer.

0.5 g of 10% Pt—Ru supporting carbon powder was mixed with 4 g of the precursor solution of an oxide superacid compound prepared in the preceding step, 1 g of water and 1 g of ethanol. The mixture was placed in an airtight vessel along with zirconia balls, which were mixed with a bench ball mill for 6 hours to prepare an anode catalyst slurry. The slurry was applied to carbon paper and dried at 60° C. for 1 hour. The resulting electrode was heated in a nitrogen stream at 600° C. for 4 hours to form an anode. The anode had a catalyst layer having a thickness of 50 μm, and had a Pt—Ru catalyst amount of 4 mg/cm$^2$ and a content of the oxide superacid compound of 21% based on the total weight of the catalyst layer.

The oxide superacid compound binder synthesized in the anode and the cathode was a mixture of molybdenum oxide and silicon oxide having an element ratio (Y/X) of molybdenum element (Y) of molybdenum oxide and silicon element (X) of silicon oxide of 0.1. The catalyst layer was released from the carbon paper and pulverized. The mixture of molybdenum oxide and silicon oxide was subjected to an X-ray diffraction measurement. The measurement revealed that all the diffraction peaks observed were ascribed to silicon oxide, and thus it was confirmed that the molybdenum oxide had an amorphous structure.

Example 4

50 mL of an ethanol solution having 1.9 g of tungsten chloride $WCl_6$ dissolved therein was mixed with 70 mL of an ethanol solution having 9 g of tetraethoxysilane $(C_2H_5O)_4Si$ dissolved therein to prepare a precursor solution of an oxide superacid compound. The solution was prepared to have an element ratio (Y/X) of tungsten element (Y) of tungsten oxide and silicon element (X) of silicon oxide of 0.1. The solution was prepared also to have a solid content of an oxide superacid compound after drying and heating of 3% based on the mixed solvent of water and ethanol.

0.5 g of 10% Pt supporting carbon powder was mixed with 4 g of the precursor solution of an oxide superacid compound prepared in the preceding step, 1 g of water and 1 g of ethanol. The mixture was placed in an airtight vessel along with zirconia balls, which were mixed with a bench ball mill for 6 hours to prepare a cathode catalyst slurry. The slurry was applied to carbon paper and dried at 60° C. for 1 hour. The resulting electrode was heated in a nitrogen stream at 600° C. for 4 hours to form a cathode. The cathode had a catalyst layer having a thickness of 49 μm, and had a Pt catalyst amount of 4 mg/cm$^2$ and a content of the oxide superacid compound of 20% based on the total weight of the catalyst layer.

0.5 g of 10% Pt—Ru supporting carbon powder was mixed with 4 g of the precursor solution of an oxide superacid compound prepared in the preceding step, 1 g of water and 1 g of ethanol. The mixture was placed in an airtight vessel along with zirconia balls, which were mixed with a bench ball mill for 6 hours to prepare an anode catalyst slurry. The slurry was applied to carbon paper and dried at 60° C. for 1 hour. The resulting electrode was heated in a nitrogen stream at 60° C. for 4 hours to form an anode. The anode had a catalyst layer having a thickness of 51 μm, and had a Pt—Ru catalyst amount of 4 mg/cm$^2$ and a content of the oxide superacid compound of 22% based on the total weight of the catalyst layer.

The oxide superacid compound binder synthesized in the anode and the cathode was a mixture of tungsten oxide and silicon oxide having an element ratio (Y/X) of tungsten element (Y) of tungsten oxide and silicon element (X) of silicon oxide of 0.1. The catalyst layer was released from the carbon paper and pulverized. The mixture of tungsten oxide and silicon oxide was subjected to an X-ray diffraction measurement. The measurement revealed that all the diffraction peaks observed were ascribed to silicon oxide, and thus it was confirmed that the tungsten oxide had an amorphous structure.

Example 5

The same procedures were repeated as in Example 1 except that 50 mL of the ethanol solution having 9 g of tetraethoxysilane $(C_2H_5O)_4Si$ dissolved therein was replaced by 70 mL of an ethanol solution having 8 g of titanium chloride $TiCl_4$ dissolved therein. The resulting cathode contained an oxide superacid compound binder having an element ratio (Y/X) of vanadium element (Y) of vanadium oxide and titanium element (X) of titanium oxide of 0.1. The cathode had a catalyst layer having a thickness of 50 μm, and had a Pt catalyst amount of 4 mg/cm$^2$ and a content of the oxide superacid compound of 21% based on the total weight of the catalyst layer. The resulting anode had a catalyst layer having a thickness of 53 μm, and had a Pt—Ru catalyst amount of 4 mg/cm$^2$ and a content of the oxide superacid compound of 21% based on the total weight of the catalyst layer.

Example 6

The same procedures were repeated as in Example 2 except that 50 mL of the ethanol solution having 9 g of tetraethoxysilane $(C_2H_5O)_4Si$ dissolved therein was replaced by 70 mL of an ethanol solution having 8 g of titanium chloride $TiCl_4$ dissolved therein. The resulting cathode contained an oxide superacid compound binder having an element ratio (Y/X) of chromium element (Y) of chromium oxide and titanium element (X) of titanium oxide of 0.1. The cathode had a catalyst layer having a thickness of 51 μm, and had a Pt catalyst amount of 4 mg/cm$^2$ and a content of the oxide superacid compound of 22% based on the total weight of the catalyst layer. The resulting anode had a catalyst layer having a thickness of 52 μm, and had a Pt—Ru catalyst amount of 4 mg/cm$^2$ and a content of the oxide superacid compound of 20% based on the total weight of the catalyst layer.

Example 7

The same procedures were repeated as in Example 3 except that 60 mL of the ethanol solution having 9 g of tetraethoxysilane $(C_2H_5O)_4Si$ dissolved therein was replaced by 80 mL of an ethanol solution having 8 g of titanium chloride $TiCl_4$ dissolved therein. The resulting cathode contained an oxide superacid compound binder having an element ratio (Y/X) of molybdenum element (Y) of molybdenum oxide and titanium element (X) of titanium oxide of 0.1. The cathode had a catalyst layer having a thickness of 53 μm, and had a Pt catalyst amount of 4 mg/cm$^2$ and a content of the oxide superacid compound of 20% based on the total weight of the catalyst layer. The resulting anode had a catalyst layer having a thickness of 56 μm, and had a Pt—Ru catalyst amount of 4 mg/cm$^2$ and a content of the oxide superacid compound of 24% based on the total weight of the catalyst layer.

Example 8

The same procedures were repeated as in Example 4 except that 70 mL of the ethanol solution having 9 g of tetraethoxysilane $(C_2H_5O)_4Si$ dissolved therein was replaced by 100 mL of an ethanol solution having 8 g of titanium chloride $TiCl_4$ dissolved therein. The resulting cathode contained an oxide superacid compound binder having an element ratio (Y/X) of tungsten element (Y) of tungsten oxide and titanium element (x) of titanium oxide of 0.1. The cathode had a catalyst layer having a thickness of 52 μm, and had a Pt catalyst amount of 4 mg/cm$^2$ and a content of the oxide superacid compound of 21% based on the total weight of the catalyst layer. The resulting anode had a catalyst layer having a thickness of 52 μm, and had a Pt—Ru catalyst amount of 4 mg/cm$^2$ and a content of the oxide superacid compound of 23% based on the total weight of the catalyst layer.

Figure 2:
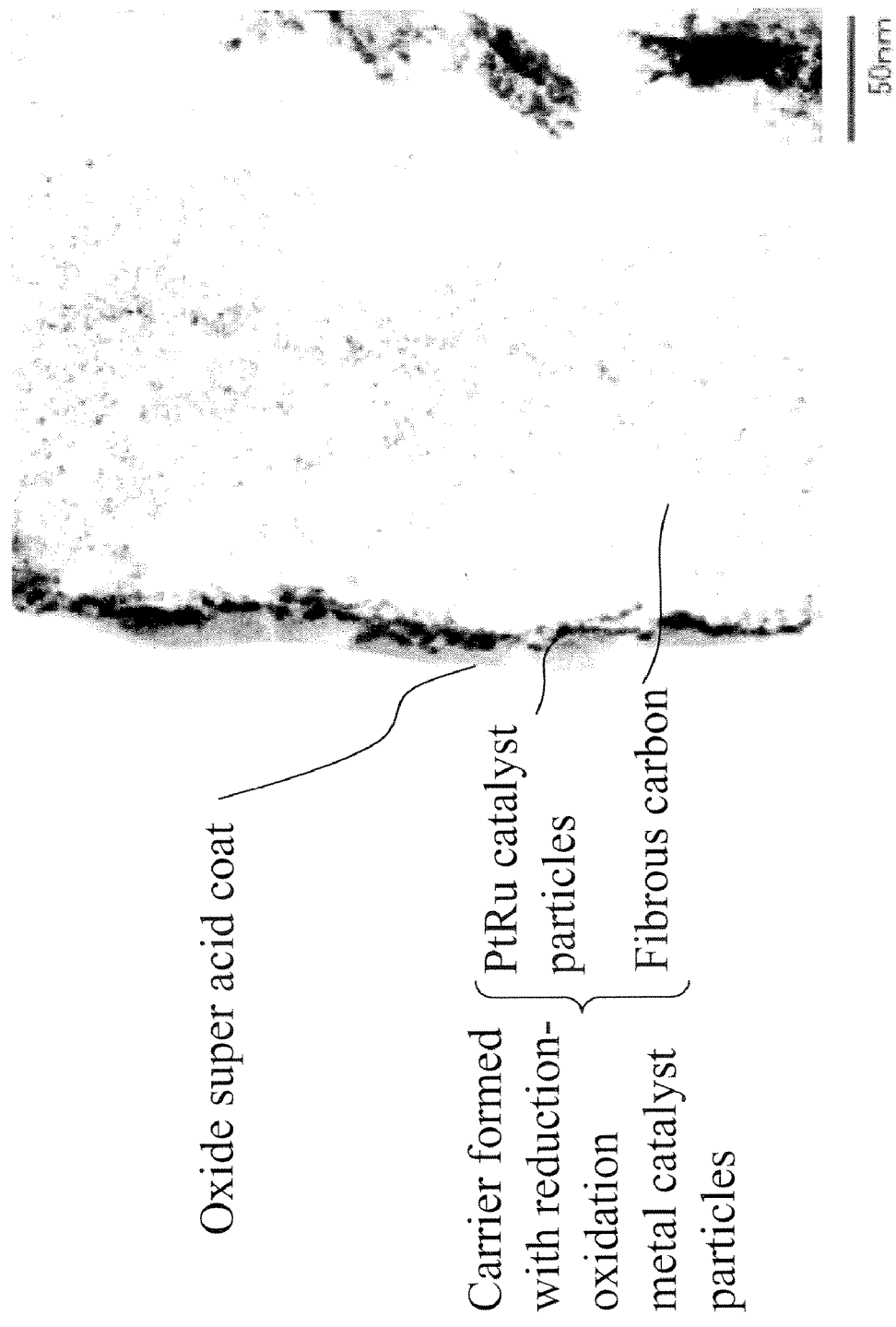
FIG. 2 is a transmission electron micrograph of an anode catalyst layer in Example 8.
Figure 3:
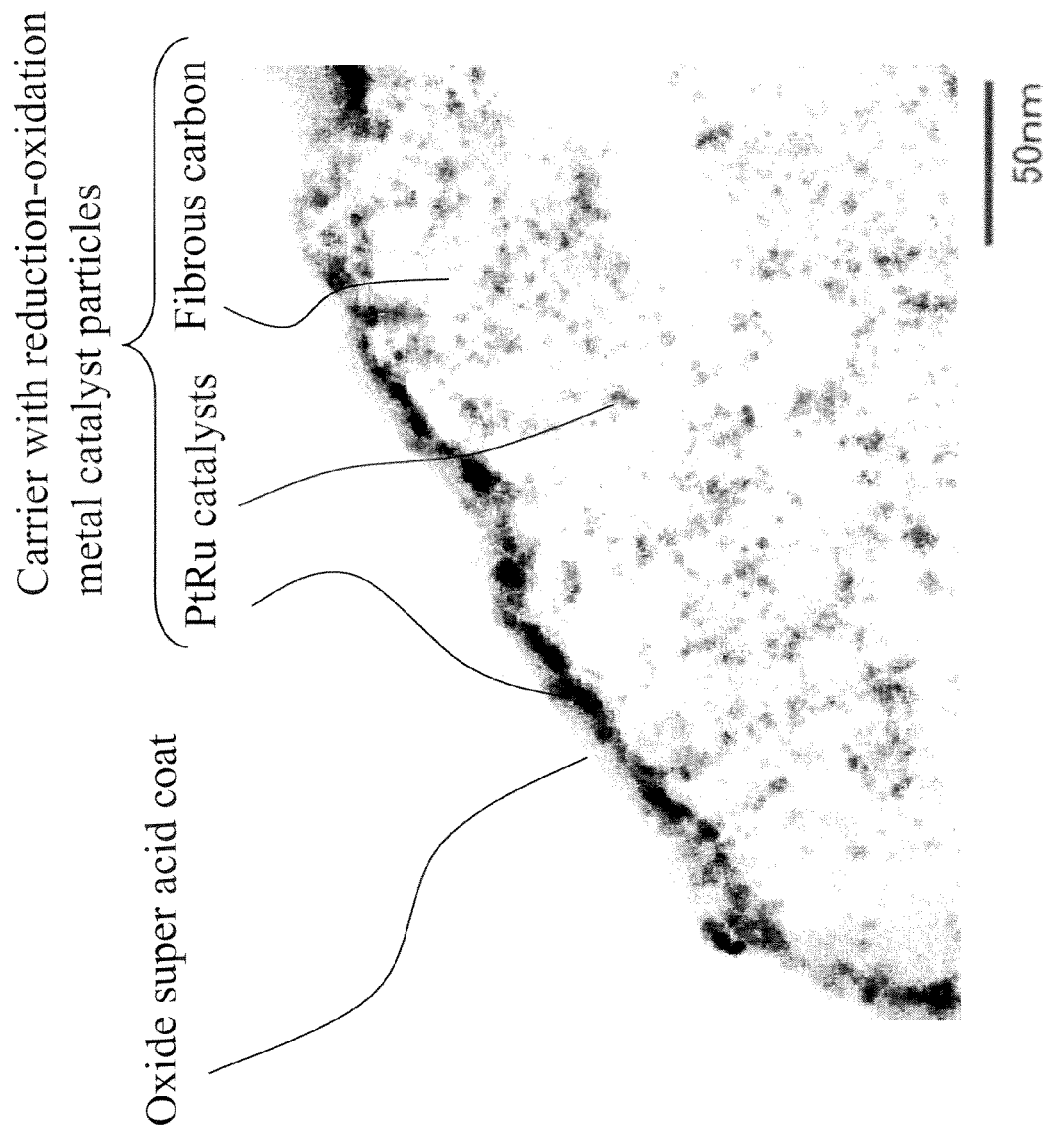
FIG. 3 is a transmission electron micrograph of an anode catalyst layer in Example 8.

FIGS. 2 and 3 show transmission electron micrographs of the anode catalyst layer obtained in Example 8. FIG. 2 shows a cross sectional view of the Pt—Ru supporting carbon containing fibrous carbon and a Pt—Ru catalyst supported thereon in the longitudinal direction of the fibrous carbon, and FIG. 3 shows a cross sectional view thereof in the direction perpendicular to the longitudinal direction of the fibrous carbon. It is understood from FIGS. 2 and 3 that the Pt—Ru supporting carbon containing fibrous carbon and a Pt—Ru catalyst supported thereon has, on the surface thereof, an oxide superacid compound coating (binder) containing tungsten oxide and titanium oxide.

Example 9

The same procedures were repeated as in Example 1 except that 50 mL of the ethanol solution having 9 g of tetraethoxysilane $(C_2H_5O)_4Si$ dissolved therein was replaced by 140 mL of an aqueous solution having 14 g of zirconium chloride oxide octahydrate $ZrOCl_2.8H_2O$ dissolved therein. The resulting cathode contained an oxide superacid compound binder having an element ratio (Y/X) of vanadium element (Y) of vanadium oxide and zirconium element (X) of zirconium oxide of 0.1. The cathode had a catalyst layer having a thickness of 51 μm, and had a Pt catalyst amount of 4 mg/cm$^2$ and a content of the oxide superacid compound of 22% based on the total weight of the catalyst layer. The resulting anode had a catalyst layer having a thickness of 52 μm, and had a Pt—Ru catalyst amount of 4 mg/cm$^2$ and a content of the oxide superacid compound of 21% based on the total weight of the catalyst layer.

Example 10

The same procedures were repeated as in Example 2 except that 50 mL of the ethanol solution having 9 g of tetraethoxysilane $(C_2H_5O)_4Si$ dissolved therein was replaced by 140 mL of an aqueous solution having 14 g of zirconium chloride oxide octahydrate $ZrOCl_2.8H_2O$ dissolved therein. The resulting cathode contained an oxide superacid compound binder having an element ratio (Y/X) of chromium element (Y) of chromium oxide and zirconium element (X) of zirconium oxide of 0.1. The cathode had a catalyst layer having a thickness of 53 μm, and had a Pt catalyst amount of 4 mg/cm$^2$ and a content of the oxide superacid compound of 20% based on the total weight of the catalyst layer. The resulting anode had a catalyst layer having a thickness of 54 μm, and had a Pt—Ru catalyst amount of 4 mg/cm$^2$ and a content of the oxide superacid compound of 21% based on the total weight of the catalyst layer.

Example 11

The same procedures were repeated as in Example 3 except that 60 mL of the ethanol solution having 9 g of tetraethoxysilane $(C_2H_5O)_4Si$ dissolved therein was replaced by 150 mL of an aqueous solution having 14 g of zirconium chloride oxide octahydrate $ZrOCl_2.8H_2O$ dissolved therein. The resulting cathode contained an oxide superacid compound binder having an element ratio (Y/X) of molybdenum element (Y) of molybdenum oxide and zirconium element (X) of zirconium oxide of 0.1. The cathode had a catalyst layer having a thickness of 51 μm, and had a Pt catalyst amount of 4 mg/cm$^2$ and a content of the oxide superacid compound of 23% based on the total weight of the catalyst layer. The resulting anode had a catalyst layer having a thickness of 52 μm, and had a Pt—Ru catalyst amount of 4 mg/cm$^2$ and a content of the oxide superacid compound of 22% based on the total weight of the catalyst layer.

Example 12

The same procedures were repeated as in Example 4 except that 70 mL of the ethanol solution having 9 g of tetraethoxysilane $(C_2H_5O)_4Si$ dissolved therein was replaced by 150 mL of an aqueous solution having 14 g of zirconium chloride oxide octahydrate $ZrOCl_2.8H_2O$ dissolved therein. The resulting cathode contained an oxide superacid compound binder having an element ratio (Y/X) of tungsten element (Y) of tungsten oxide and zirconium element (X) of zirconium oxide of 0.1. The cathode had a catalyst layer having a thickness of 53 μm, and had a Pt catalyst amount of 4 mg/cm$^2$ and a content of the oxide superacid compound of 20% based on the total weight of the catalyst layer. The resulting anode had a catalyst layer having a thickness of 54 μm, and had a Pt—Ru catalyst amount of 4 mg/cm$^2$ and a content of the oxide superacid compound of 23% based on the total weight of the catalyst layer.

Example 13

The same procedures were repeated as in Example 1 except that 50 mL of the ethanol solution having 9 g of tetraethoxysilane $(C_2H_5O)_4Si$ dissolved therein was replaced by 190 mL of an aqueous solution having 16 g of tin chloride pentahydrate $SnCl_4.5H_2O$ dissolved therein. The resulting cathode contained an oxide superacid compound binder having an element ratio (Y/X) of vanadium element (Y) of vanadium oxide and tin element (X) of tin oxide of 0.1. The cathode had a catalyst layer having a thickness of 52 μm, and had a Pt catalyst amount of 4 mg/cm$^2$ and a content of the oxide superacid compound of 20% based on the total weight of the catalyst layer. The resulting anode had a catalyst layer having a thickness of 51 μm, and had a Pt—Ru catalyst amount of 4 mg/cm$^2$ and a content of the oxide superacid compound of 23% based on the total weight of the catalyst layer.

Example 14

The same procedures were repeated as in Example 2 except that 50 mL of the ethanol solution having 9 g of tetraethoxysilane $(C_2H_5O)_4Si$ dissolved therein was replaced by 190 mL of an aqueous solution having 16 g of tin chloride pentahydrate $SnCl_4.5H_2O$ dissolved therein. The resulting cathode contained an oxide superacid compound binder having an element ratio (Y/X) of chromium element (Y) of chromium oxide and tin element (X) of tin oxide of 0.1. The cathode had a catalyst layer having a thickness of 53 μm, and had a Pt catalyst amount of 4 mg/cm$^2$ and a content of the oxide superacid compound of 21% based on the total weight of the catalyst layer. The resulting anode had a catalyst layer having a thickness of 54 μm, and had a Pt—Ru catalyst amount of 4 mg/cm$^2$ and a content of the oxide superacid compound of 25% based on the total weight of the catalyst layer.

Example 15

The same procedures were repeated as in Example 3 except that 60 mL of the ethanol solution having 9 g of tetraethoxysilane $(C_2H_5O)_4Si$ dissolved therein was replaced by 200 mL of an aqueous solution having 16 g of tin chloride pentahydrate $SnCl_4.5H_2O$ dissolved therein. The resulting cathode contained an oxide superacid compound binder having an element ratio (Y/X) of molybdenum element (Y) of molybdenum oxide and tin element (X) of tin oxide of 0.1. The cathode had a catalyst layer having a thickness of 52 μm, and had a Pt catalyst amount of 4 mg/cm$^2$ and a content of the oxide superacid compound of 20% based on the total weight of the catalyst layer. The resulting anode had a catalyst layer having a thickness of 51 μm, and had a Pt—Ru catalyst amount of 4 mg/cm² and a content of the oxide superacid compound of 25% based on the total weight of the catalyst layer.

Example 16

The same procedures were repeated as in Example 4 except that 70 mL of the ethanol solution having 9 g of tetraethoxysilane $(C_2H_5O)_4Si$ dissolved therein was replaced by 200 mL of an aqueous solution having 16 g of tin chloride pentahydrate $SnCl_4.5H_2O$ dissolved therein. The resulting cathode contained an oxide superacid compound binder having an element ratio (Y/X) of tungsten element (Y) of tungsten oxide and tin element (X) of tin oxide of 0.1. The cathode had a catalyst layer having a thickness of 55 μm, and had a Pt catalyst amount of 4 mg/cm² and a content of the oxide superacid compound of 21% based on the total weight of the catalyst layer. The resulting anode had a catalyst layer having a thickness of 52 μm, and had a Pt—Ru catalyst amount of 4 mg/cm² and a content of the oxide superacid compound of 22% based on the total weight of the catalyst layer.

Example 17

The same procedures were repeated as in Example 1 except that 50 mL of the ethanol solution having 9 g of tetraethoxysilane $(C_2H_5O)_4Si$ dissolved therein was replaced by 350 mL of an ethanol solution having 25 g of tetra-i-propoxy hafnium $Hf(O-i-C_3H_7)_4$ dissolved therein, 50 mL of the distilled water having 0.7 g of vanadium chloride $VCl_3$ dissolved therein was replaced by 50 mL of an ethanol solution having 0.7 g of trimethyl borate $B(OCH_3)_3$ dissolved therein, and hydrolysis was carried out. The resulting cathode contained an oxide superacid compound binder having an element ratio (Y/X) of boron element (Y) of boron oxide and hafnium element (X) of hafnium oxide of 0.1. The cathode had a catalyst layer having a thickness of 52 μm, and had a Pt catalyst amount of 4 mg/cm² and a content of the oxide superacid compound of 20% based on the total weight of the catalyst layer. The resulting anode had a catalyst layer having a thickness of 53 μm, and had a Pt—Ru catalyst amount of 4 mg/cm² and a content of the oxide superacid compound of 20% based on the total weight of the catalyst layer.

Example 18

The same procedures were repeated as in Example 1 except that 50 mL of the ethanol solution having 9 g of tetraethoxysilane $(C_2H_5O)_4Si$ dissolved therein was replaced by 230 mL of an ethanol solution having 18 g of tri-i-propoxy indium $In(O-i-C_3H_7)_3$ dissolved therein, 50 mL of the distilled water having 0.7 g of vanadium chloride $VCl_3$ dissolved therein was replaced by 50 mL of an ethanol solution having 0.7 g of trimethyl borate $B(OCH_3)_3$ dissolved therein, and hydrolysis was carried out. The resulting cathode contained an oxide superacid compound binder having an element ratio (Y/X) of boron element (Y) of boron oxide and indium element (X) of indium oxide of 0.1. The cathode had a catalyst layer having a thickness of 51 μm, and had a Pt catalyst amount of 4 mg/cm² and a content of the oxide superacid compound of 23% based on the total weight of the catalyst layer. The resulting anode had a catalyst layer having a thickness of 50 μm, and had a Pt—Ru catalyst amount of 4 mg/cm² and a content of the oxide superacid compound of 22% based on the total weight of the catalyst layer.

Example 19

The same procedures were repeated as in Example 1 except that 50 mL of the ethanol solution having 9 g of tetraethoxysilane $(C_2H_5O)_4Si$ dissolved therein was replaced by 180 mL of an ethanol solution having 17 g of tetraethoxy germanium $Ge(OC_2H_5)_4$ dissolved therein, 50 mL of the distilled water having 0.7 g of vanadium chloride $VCl_3$ dissolved therein was replaced by 50 mL of an ethanol solution having 0.7 g of trimethyl borate $B(OCH_3)_3$ dissolved therein, and hydrolysis was carried out. The resulting cathode contained an oxide superacid compound binder having an element ratio (Y/X) of boron element (Y) of boron oxide and germanium element (X) of germanium oxide of 0.1. The cathode had a catalyst layer having a thickness of 53 μm, and had a Pt catalyst amount of 4 mg/cm² and a content of the oxide superacid compound of 24% based on the total weight of the catalyst layer. The resulting anode had a catalyst layer having a thickness of 51 μm, and had a Pt—Ru catalyst amount of 4 mg/cm² and a content of the oxide superacid compound of 21% based on the total weight of the catalyst layer.

Example 20

The same procedures were repeated as in Example 1 except that 50 mL of the ethanol solution having 9 g of tetraethoxysilane $(C_2H_5O)_4Si$ dissolved therein was replaced by 160 mL of an ethanol solution having 17 g of tri-i-propoxy gallium $Ga(O-i-C_3H_7)_3$ dissolved therein, 50 mL of the distilled water having 0.7 g of vanadium chloride $VCl_3$ dissolved therein was replaced by 50 mL of an ethanol solution having 0.7 g of trimethyl borate $B(OCH_3)_3$ dissolved therein, and hydrolysis was carried out. The resulting cathode contained an oxide superacid compound binder having an element ratio (Y/X) of boron element (Y) of boron oxide and gallium element (x) of gallium oxide of 0.1. The cathode had a catalyst layer having a thickness of 50 μm, and had a Pt catalyst amount of 4 mg/cm² and a content of the oxide superacid compound of 22% based on the total weight of the catalyst layer. The resulting anode had a catalyst layer having a thickness of 52 μm, and had a Pt—Ru catalyst amount of 4 mg/cm² and a content of the oxide superacid compound of 24% based on the total weight of the catalyst layer.

Example 21

The same procedures were repeated as in Example 1 except that 50 mL of the ethanol solution having 9 g of tetraethoxysilane $(C_2H_5O)_4Si$ dissolved therein was replaced by 350 mL of an ethanol solution having 30 g of cerium nitrate hexahydrate $Ce(NO_3)_3.6H_2O$ dissolved therein, 50 mL of the distilled water having 0.7 g of vanadium chloride $VCl_3$ dissolved therein was replaced by 50 mL of an ethanol solution having 0.7 g of trimethyl borate $B(OCH_3)_3$ dissolved therein, and hydrolysis was carried out. The resulting cathode contained an oxide superacid compound binder having an element ratio (Y/X) of boron element (Y) of boron oxide and cerium element (X) of cerium oxide of 0.1. The cathode had a catalyst layer having a thickness of 51 μm, and had a Pt catalyst amount of 4 mg/cm² and a content of the oxide superacid compound of 22% based on the total weight of the catalyst layer. The resulting anode had a catalyst layer having a thickness of 52 μm, and had a Pt—Ru catalyst amount of 4 mg/cm² and a content of the oxide superacid compound of 23% based on the total weight of the catalyst layer.

Example 22

The same procedures were repeated as in Example 1 except that 50 mL of the ethanol solution having 9 g of tetraethoxysilane $(C_2H_5O)_4Si$ dissolved therein was replaced by 230 mL of an ethanol solution having 20 g of niobium ethoxide $Nb(OC_2H_5)_5$ dissolved therein, 50 mL of the distilled water having 0.7 g of vanadium chloride $VCl_3$ dissolved therein was replaced by 50 mL of an ethanol solution having 0.7 g of trimethyl borate $B(OCH_3)_3$ dissolved therein, and hydrolysis was carried out. The resulting cathode contained an oxide superacid compound binder having an element ratio (Y/X) of boron element (Y) of boron oxide and niobium element (X) of niobium oxide of 0.1. The cathode had a catalyst layer having a thickness of 50 μm, and had a Pt catalyst amount of 4 mg/cm$^2$ and a content of the oxide superacid compound of 23% based on the total weight of the catalyst layer. The resulting anode had a catalyst layer having a thickness of 54 μm, and had a Pt—Ru catalyst amount of 4 mg/cm$^2$ and a content of the oxide superacid compound of 22% based on the total weight of the catalyst layer.

Comparative Example 1

An electrode containing 10% Pt supporting carbon as a cathode catalyst (catalyst amount: Pt 4 mg/cm$^2$, produced by E-Tek, Inc.) was impregnated with a 5% Nafion solution to prepare a cathode. An electrode containing 10% Pt—Ru supporting carbon as an anode catalyst (catalyst amount: Pt—Ru 4 mg/cm$^2$, produced by E-Tek, Inc.) was impregnated with a 5% Nafion solution to prepare an anode.

Comparative Example 2

7 g of titanium oxide $TiO_2$ was added to 300 mL of distilled water having 2 g of vanadium chloride $VCl_3$ dissolved therein to prepare a mixed solution, which was then heated to 80° C. under continuous stirring to remove water at an evaporation rate of 100 mL/hr. Thereafter, the mixed solution was further retained in a dryer at 100° C. for 12 hours to obtain powder. The powder was pulverized in an agate mortar, heated in an alumina crucible to 600° C. at a temperature increasing rate of 100° C. per hour, and further retained at 600° C. for 4 hours. As a result, vanadium oxide supporting silicon oxide having an element ratio (Y/X) of vanadium element (Y) of vanadium oxide and titanium element (X) of titanium oxide of 0.1, and a specific surface area of 55 m$^2$/g. The vanadium oxide supporting silicon oxide was subjected to an X-ray diffraction measurement. The measurement revealed that all the diffraction peaks observed were ascribed to silicon oxide, and thus it was confirmed that the vanadium oxide had an amorphous structure.

0.5 g of 10% Pt supporting carbon powder was mixed with 0.15 g of the oxide superacid compound powder prepared in the preceding step, 2 g of a 5% PVA aqueous solution, 2.5 g of ethanol and 2.5 g of water. The mixture was placed in an airtight vessel along with zirconia balls, which were mixed with a bench ball mill for 6 hours to prepare a cathode catalyst slurry. The slurry was applied to carbon paper and dried at 60° C. for 1 hour. The resulting electrode was heated in a nitrogen stream at 150° C. for 10 minutes to form a cathode. The cathode had a catalyst layer having a thickness of 50 μm, and had a Pt catalyst amount of 4 mg/cm$^2$ and a content of the oxide superacid compound of 20% based on the total weight of the catalyst layer.

0.5 g of 10% Pt—Ru supporting carbon powder was mixed with 0.15 g of the oxide superacid compound powder prepared in the preceding step, 2 g of a 5% PVA aqueous solution, 2.5 g of ethanol and 2.5 g of water. The mixture was placed in an airtight vessel along with zirconia balls, which were mixed with a bench ball mill for 6 hours to prepare an anode catalyst slurry. The slurry was applied to carbon paper and dried at 60° C. for 1 hour. The resulting electrode was heated in a nitrogen stream at 150° C. for 10 minutes to form an anode. The anode had a catalyst layer having a thickness of 52 μm, and had a Pt—Ru catalyst amount of 4 mg/cm$^2$ and a content of the oxide superacid compound of 21% based on the total weight of the catalyst layer.

The catalyst layers of the anodes and the cathodes obtained in Examples 1 to 18 were released from the carbon paper and pulverized. It was found that the proton conductive binders exhibited solid superacidity by using an acid indicator containing m-nitrotoluene (pKa=−11.99), p-nitrofluorobenzene (pKa=−12.40), p-nitrochlorobenzene (pKa=−12.70), m-nitrochlorobenzene (pKa=−13.16), 2,4-dinitrotoluene (pKa=−13.75), 2,4-dinitrofluorobenzene (pKa=−14.52) and 1,3,5-trinitrobenzene (pKa=−16.04). In the case where $SnO_2$ or the oxide superacid compound is colored, it is difficult to evaluate solid acidity by discoloration of an acid indicator. In this case, the solid superacidity can be measured by using the temperature programmed desorption (TPD) method of ammonia, in which ammonia gas is adsorbed on a solid acid sample, which is then heated to detect the desorption amount and the desorption temperature of ammonia thus desorbed. The acidity function of Hammett $H_0$ of the respective proton conductive membranes are shown in Table 1 below.

Figure 4:
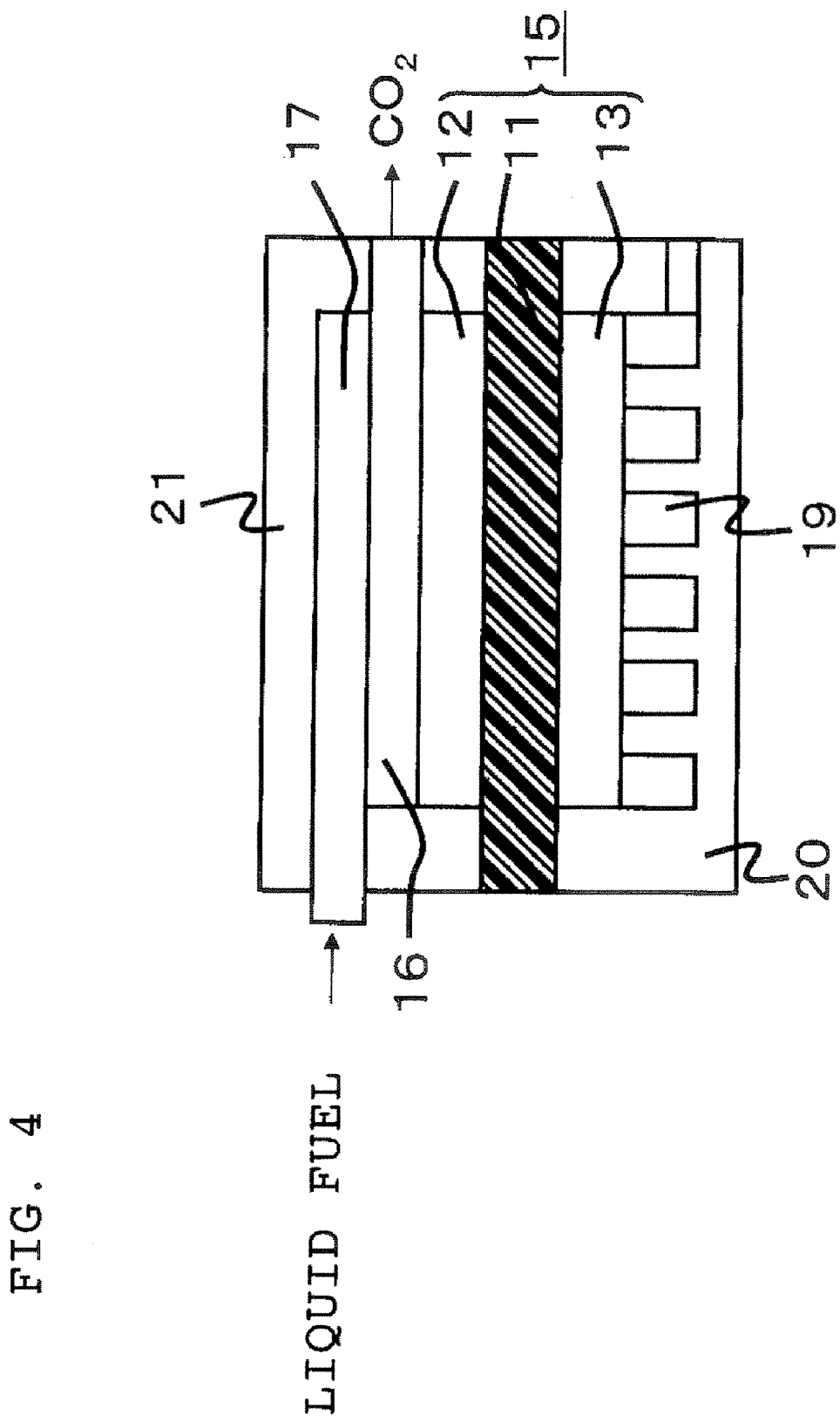
FIG. 4 is an exemplary schematic cross sectional view showing a structure of a liquid fuel cell of the examples.

Liquid fuel cells were fabricated by using the electrodes of Examples 1 to 21 and Comparative Examples 1 and 2 in the manner described below. FIG. 4 is a schematic cross sectional view showing the constitution of the liquid fuel cells.

A perfluorosulfonic acid membrane (Nafion 177 membrane) was disposed between a fuel electrode 12 and an oxidant electrode 13, and the assembly was bonded by hot-pressing at a temperature of 120° C. and a pressure of 100 kg/cm$^2$ for 5 minutes to prepare a membrane electrode composite, which was used as an electrogenic part 15.

A carbon porous plate having an average pore diameter of 100 μm and a porosity of 70% was accumulated as a fuel vaporizing part 16 onto the fuel electrode 12 of the electrogenic part 15. A carbon porous plate having an average pore diameter of 5 μm and a porosity of 40% was accumulated as a fuel penetrating part 17 onto the fuel vaporizing part 16. The assembly was installed in an oxidant electrode holder 20 equipped with oxidant gas feeding grooves 19, and a fuel electrode holder 21, so as to produce a single cell having a structure shown in FIG. 4. The single cell had a reaction area of 10 cm$^2$. The oxidant gas feeding grooves 19 of the oxidant electrode holder 20 had a depth of 2 mm and a width of 1 mm.

A 20% methanol aqueous solution was fed to the resulting liquid fuel cell through the side surface of the fuel penetrating part 17 as shown in FIG. 4. As an oxidant gas, air at 1 atm was fed to the gas channels 19 at a rate of 100 mL/min to perform electric power generation. Carbon dioxide gas ($CO_2$) formed associated with the electric power generation reaction was exhausted from the fuel vaporizing part 16 as shown in FIG. 4. The maximum output power amounts are shown in Table 1 below.

The cell resistance of the liquid fuel cell was measured by applying an alternating current voltage of 1 kHz between current withdrawing plates in contact with the cell holders made of carbon, and then measuring the electric current value flowing therebetween with a resistance meter. The cell resistance values are shown in Table 1 below.

Table 1 below shows the cell resistance values and the results obtained with a 20% methanol aqueous solution.

TABLE 1

| | Oxide B Element Y | Oxide A containing Element X | Element ratio (X/Y) | Acid degree function $H_0$ | Cell resistance (mΩ) | Maximum output power amount with 20% methanol (mW/cm²) |
|---|---|---|---|---|---|---|
| Example 1 | V | $SiO_2$ | 0.1 | −11.99 | 25 | 13 |
| Example 2 | Cr | $SiO_2$ | 0.1 | −11.99 | 24 | 14 |
| Example 3 | Mo | $SiO_2$ | 0.1 | −12.40 | 23 | 15 |
| Example 4 | W | $SiO_2$ | 0.1 | −12.40 | 22 | 18 |
| Example 5 | V | $TiO_2$ | 0.1 | −12.70 | 20 | 20 |
| Example 6 | Cr | $TiO_2$ | 0.1 | −12.70 | 19 | 22 |
| Example 7 | Mo | $TiO_2$ | 0.1 | −13.16 | 17 | 23 |
| Example 8 | W | $TiO_2$ | 0.1 | −13.16 | 16 | 24 |
| Example 9 | V | $ZrO_2$ | 0.1 | −13.75 | 15 | 26 |
| Example 10 | Cr | $ZrO_2$ | 0.1 | −13.75 | 14 | 27 |
| Example 11 | Mo | $ZrO_2$ | 0.1 | −14.50 | 12 | 28 |
| Example 12 | W | $ZrO_2$ | 0.1 | −14.50 | 10 | 30 |
| Example 13 | V | $SnO_2$ | 0.1 | −15.00 | 12 | 29 |
| Example 14 | Cr | $SnO_2$ | 0.1 | −15.00 | 11 | 31 |
| Example 15 | Mo | $SnO_2$ | 0.1 | −16.04 | 10 | 32 |
| Example 16 | W | $SnO_2$ | 0.1 | −16.04 | 10 | 34 |
| Example 17 | B | $HfO_2$ | 0.1 | −14.50 | 13 | 26 |
| Example 18 | B | $In_2O_3$ | 0.1 | −12.40 | 21 | 19 |
| Example 19 | B | $GeO_2$ | 0.1 | −12.40 | 23 | 16 |
| Example 20 | B | $Ga_2O_3$ | 0.1 | −11.99 | 24 | 14 |
| Example 21 | B | $CeO_2$ | 0.1 | −13.75 | 16 | 23 |
| Example 22 | B | $Nb_2O_3$ | 0.1 | −12.40 | 20 | 21 |
| Comparative Example 1 | — | — | — | — | 30 | 2.0 |
| Comparative Example 2 | V | $TiO_2$ | 0.1 | −12.70 | | 13 |

It is understood from the results shown in Table 1 that the electrodes of Examples 1 to 21 have cell resistance values that are significantly lower than that of the electrode using the Nafion solution as a catalyst layer binder in Comparative Example 1.

As shown by Comparative Example 1, the electrode using the Nafion solution in the catalyst layer did not undergo sufficient reaction of methanol in the catalyst layer with a 20% methanol solution, and methanol crossover largely affected the output power. Furthermore, only an output power generation amount of 2.0 mW/cm² at most was obtained due to the high cell resistance. The fuel cells having the electrodes using the oxide superacid compounds of Examples 1 to 12 as the binder of the catalyst layer underwent favorably electrode reaction, and a sufficient output power generation amount can be obtained owing to the low resistance of the catalyst layer and the low cell resistance. The fuel cells of Examples 13 to 16 using $SnO_2$ as the oxide carrier exhibited a large output power generation amount, and among these, the fuel cell of Example 16 using tungsten oxide particles carried thereon exhibited the best result. Unit cells having electrodes using the oxide superacid compounds of Examples 1 to 21 as the binder of the catalyst layer, respectively, were fed with a 20% methanol aqueous solution as a fuel. Air was fed to the cells, and both surfaces of the cells were heated to 40° C. to collect an electric current of 10 mA/cm², whereby the time-lapse stability of the cell performance was evaluated. As a result, the output power was stable after lapsing several hours in Examples 1 to 21.

A cell having the electrode using the Nafion solution as a catalyst layer binder (Comparative Example 1) was fed with a 20% methanol aqueous solution as a fuel. Air was fed to the cell, and both surfaces of the cell were heated to 40° C. to collect an electric current of 10 mA/cm², whereby the time-lapse stability of the cell performance was evaluated. As a result, the output power was lost within several minutes.

Example 23

The same procedures were repeated as in Example 1 except that the anode obtained in Example 1 was subjected to a hydrophilic treatment in such a manner that the electrode was impregnated in several times with a 1% PVA solution, and then dried at 60° C. for 1 hour, followed by subjecting a heat treatment at 150° C. for 10 minutes. The resulting cathode contained an oxide superacid compound binder having an element ratio (Y/X) of vanadium element (Y) of vanadium oxide and silicon element (X) of silicon oxide of 0.1. The cathode had a catalyst layer having a thickness of 51 μm, and had a Pt catalyst amount of 4 mg/cm² and a content of the oxide superacid compound of 20% based on the total weight of the catalyst layer. The resulting hydrophilic anode had a catalyst layer having a thickness of 53 μm, and had a Pt—Ru catalyst amount of 4 mg/cm², a content of the oxide superacid compound of 20% based on the total weight of the catalyst layer, and a PVA content of 5%. The PVA used herein had an equilibrium water absorption coefficient of 20%.

Example 24

The same procedures were repeated as in Example 1 except that the cathode obtained in Example 1 was subjected to a water repellent treatment in such a manner that the electrode was impregnated in several times with a 1% PTFE dispersion liquid, and then dried at 60° C. for 1 hour, followed by subjecting a heat treatment at 350° C. for 10 minutes. The resulting water repellent cathode contained an oxide superacid compound binder having an element ratio (Y/X) of vanadium element (Y) of vanadium oxide and silicon element (X) of silicon oxide of 0.1. The anode had a catalyst layer having a thickness of 52 μm, and had a Pt—Ru catalyst amount of 4 mg/cm², and a content of the oxide superacid compound of 21% based on the total weight of the catalyst layer. The resulting cathode had a catalyst layer having a thickness of 52 μm, and had a Pt catalyst amount of 4 mg/cm², a content of the oxide superacid compound of 23% and a PTFE content of 5% based on the total weight of the catalyst layer.

Liquid fuel cells were fabricated by using these electrodes in the same manner as in Example 1.

The resulting fuel cells of Examples 23 and 24 were measured for the cell resistance and the maximum output power amount in the same manner as described above. The results obtained are shown in Table 2 below. The results of Example 1 are also shown in Table 2.

TABLE 2

| | Oxide B Element Y | Oxide A containing Element X | Element ratio (X/Y) | Polymer for modifying anode | Polymer for modifying cathode | Equilibrium water absorption coefficient (%) | Cell resistance (mΩ) | Maximum output power amount with 20% methanol (mw/cm2) |
|---|---|---|---|---|---|---|---|---|
| Example 1 | V | SiO2 | 0.1 | — | — | — | 25 | 13 |
| Example 23 | V | SiO2 | 0.1 | PVA | — | 20 | 21 | 19 |
| Example 24 | V | SiO2 | 0.1 | — | PTFE | — | 28 | 15 |

It is understood from the results shown in Table 2 that the hydrophilic treatment of the anode electrode with PVA facilitates penetration of methanol as a liquid fuel into the catalyst layer, i.e., facilitates feeding of the liquid fuel, to provide a large output power amount. In the case where the cathode is subjected to the water repellent treatment with PTFE, it is expected that water generated upon electric power generation is hard to stay in the catalyst layer to reduce the amount of water fed to the proton conductive inorganic oxide binder. Therefore, it is considered that a high output power amount is obtained since feeding of the oxidant to the cathode is facilitated although the cell resistance is increased.

Example 25

The same procedures were repeated as in Example 9 except that the heating temperature was changed from 600 (C to 300 (C. The resulting cathode contained an oxide superacid compound binder having an element ratio (Y/X) of vanadium element (Y) of vanadium oxide and zirconium element (X) of zirconium oxide of 0.1. The cathode had a catalyst layer having a thickness of 50 (m, and had a Pt catalyst amount of 4 mg/cm² and a content of the oxide superacid compound of 22% based on the total weight of the catalyst layer. The resulting anode had a catalyst layer having a thickness of 51 (m, and had a Pt—Ru catalyst amount of 4 mg/cm² and a content of the oxide superacid compound of 20% based on the total weight of the catalyst layer.

Example 26

The same procedures were repeated as in Example 9 except that the heating temperature was changed from 600 (C to 800 (C, The resulting cathode contained an oxide superacid compound binder having an element ratio (Y/X) of vanadium element (Y) of vanadium oxide and zirconium element (X) of zirconium oxide of 0.1. The cathode had a catalyst layer having a thickness of 51 (m, and had a Pt catalyst amount of 4 mg/cm² and a content of the oxide superacid compound of 23% based on the total weight of the catalyst layer. The resulting anode had a catalyst layer having a thickness of 52 (m, and had a Pt—Ru catalyst amount of 4 mg/cm² and a content of the oxide superacid compound of 23% based on the total weight of the catalyst layer.

Example 27

The same procedures were repeated as in Example 9 except that 20 mL of an aqueous solution having 1.5 g of yttrium acetate tetrahydrate $Y(CH_3COO)_3 \cdot 4H_2O$ was added, and the heating temperature was changed from 600° C. to 800° C. The resulting cathode contained an oxide superacid compound binder having an element ratio (Y/X) of vanadium element (Y) of vanadium oxide and zirconium element (X) of zirconium oxide of 0.1, and the amount of yttrium element (Z) of 7 mol % based on the total amount of vanadium element (Y) of vanadium oxide, zirconium element (X) of zirconium oxide and yttrium element (Z) of yttrium oxide. The cathode had a catalyst layer having a thickness of 52 μm, and had a Pt catalyst amount of 4 mg/cm² and a content of the oxide superacid compound of 23% based on the total weight of the catalyst layer. The resulting anode had a catalyst layer having a thickness of 50 μm, and had a Pt—Ru catalyst amount of 4 mg/cm² and a content of the oxide superacid compound of 20% based on the total weight of the catalyst layer.

Liquid fuel cells were fabricated by using these electrodes in the same manner as in Example 1.

The resulting fuel cells of Examples 25, 26 and 27 were measured for the cell resistance and the maximum output power amount in the same manner as described above. The results obtained are shown in Table 3 below. The results of Example 9 are also shown in Table 3.

TABLE 3

| | Oxide B Element Y | Oxide A containing Element X | Oxide C containing Element Z (additive) | Element ratio (X/Y) | Element ratio (Z/X + Y + Z) | Heat treatment temperature (° C.) | Cell resistance (mΩ) | Maximum output power amount with 20% methanol (mW/cm2) |
|---|---|---|---|---|---|---|---|---|
| Example 9 | V | ZrO2 | — | 0.1 | | 600 | 25 | 13 |
| Example 25 | V | ZrO2 | — | 0.1 | | 300 | 30 | 5.0 |

TABLE 3-continued

|  | Oxide B Element Y | Oxide A containing Element X | Oxide C containing Element Z (additive) | Element ratio (X/Y) | Element ratio (Z/X + Y + Z) | Heat treatment temperature (° C.) | Cell resistance (mΩ) | Maximum output power amount with 20% methanol (mW/cm2) |
|---|---|---|---|---|---|---|---|---|
| Example 26 | V | ZrO2 | — | 0.1 | | 800 | 28 | 9 |
| Example 27 | V | ZrO2 | Y2O3 | 0.1 | 0.08 | 800 | 25 | 12 |

It is understood from the results shown in Table 3 that the at a heat-treating temperature of 300 (C, the cell resistance is increased due to insufficient bonding between vanadium oxide and zirconium oxide to lower the output. In the case where the electrode was heated at 800 (C, severe cracks were formed in the electrode catalyst layer. It is considered that this is because stress is formed by increasing the crystallinity of the proton conductive inorganic oxide binder, whereby volume contraction and aggregation of the oxide bring about cracks in the catalyst. It is furthermore considered that the aggregation decreases the three-phase interface amount, and methanol as the fuel is in direct contact with the electrolyte membrane through the cracks, whereby the methanol crossover amount is increased to lower the output. In the case where yttrium oxide was added to the constitutional oxides of the proton conductive inorganic oxide binder, no crack was formed in the electrode catalyst layer. It is expected that this is ascribed to such a phenomenon that yttrium oxide stabilizes the change in crystal system of the proton conductive inorganic oxide binder due to heating. It is considered that the electrode heated at 600 (C shows the highest output because of the overall conditions including the heating temperature and the minute structures, particularly the three-phase interface amount, of the oxide superacid compound.

Example 28

50 mL of distilled water having 0.7 g of vanadium chloride VCl3 dissolved therein was mixed with 50 mL of an ethanol solution having 9 g of tetraethoxysilane (C2H5O)4Si dissolved therein to prepare a precursor solution of an oxide superacid compound. The solution was prepared to have an element ratio (Y/X) of vanadium element (Y) of vanadium oxide and silicon element (X) of silicon oxide of 0.1. The solution was prepared also to have a solid content of an oxide superacid compound after drying and heating of 3% based on the mixed solvent of water and ethanol.

0.5 g of 10% Pt supporting carbon powder was mixed with 1 g of water and 1 g of ethanol. The mixture was placed in an airtight vessel along with zirconia balls, which were mixed with a bench ball mill for 6 hours to prepare a cathode catalyst slurry. The slurry was applied to carbon paper and dried at 60 (C for 1 hour. The electrode was impregnated with 4 g of the precursor solution of an oxide superacid compound prepared in the preceding step, and dried at 60 (C for 1 hour. The electrode was then heated in a nitrogen stream at 600 (C for 4 hours to form a cathode. The cathode had a catalyst layer having a thickness of 51 (m, and had a Pt catalyst amount of 4 mg/cm2 and a content of the oxide superacid compound of 22% based on the total weight of the catalyst layer.

0.5 g of 10% Pt—Ru supporting carbon powder was mixed with 1 g of water and 1 g of ethanol. The mixture was placed in an airtight vessel along with zirconia balls, which were mixed with a bench ball mill for 6 hours to prepare an anode catalyst slurry. The slurry was applied to carbon paper and dried at 60° C. for 1 hour. The electrode was impregnated with 4 g of the precursor solution of an oxide superacid compound prepared in the preceding step, and dried at 60° C. for 1 hour. The electrode was then heated in a nitrogen stream at 600° C. for 4 hours to form an anode. The anode had a catalyst layer having a thickness of 52 μm, and had a Pt—Ru catalyst amount of 4 mg/cm$^2$ and a content of the oxide superacid compound of 20% based on the total weight of the catalyst layer.

The oxide superacid compound binder synthesized in the anode and the cathode was vanadium oxide supporting silicon oxide having an element ratio (Y/X) of vanadium element (Y) of vanadium oxide and silicon element (X) of silicon oxide of 0.1. The catalyst layer was released from the carbon paper and pulverized. The vanadium oxide supporting silicon oxide was subjected to an X-ray diffraction measurement. The measurement revealed that all the diffraction peaks observed were ascribed to silicon oxide, and thus it was confirmed that the vanadium oxide had an amorphous structure.

A liquid fuel cell was fabricated by using the electrode in the same manner as in Example 1.

The resulting fuel cell of Example 28 was measured for the cell resistance and the maximum output power amount in the same manner as described above. The results obtained are shown in Table 4 below. The results of Example 1 are also shown in Table 4.

TABLE 4

|  | Oxide B Element Y | Oxide A containing Element X | Element ratio (X/Y) | Cell resistance (mΩ) | Maximum output power amount with 20% methanol (mW/cm$^2$) |
|---|---|---|---|---|---|
| Example 1 | V | SiO$_2$ | 0.1 | 25 | 13 |
| Example 28 | V | SiO$_2$ | 0.1 | 21 | 17 |

It is understood from the results shown in Table 4 that the electrode obtained by forming a catalyst layer containing catalyst particles on carbon paper and then binding the layer with the proton conductive inorganic oxide binder can sufficiently ensure electron conductivity to lower the cell resistance, as compared to the case where the precursor solution of the oxide superacid compound is added to the catalyst slurry. It is considered that this is because the carbon particles as the carrier of the catalyst can be previously in such a state that the carbon particles are connected to each other, whereby a higher maximum output power amount is obtained.

Example 29

5 g of silicon oxide SiO$_2$ was added to 300 mL of distilled water having 2 g of vanadium chloride VCl$_3$ dissolved therein to prepare a mixed solution, which was then heated to 80° C. under continuous stirring to remove water at an evaporation rate of 100 mL/hr. Thereafter, the mixed solution was further retained in a dryer at 100° C. for 12 hours to obtain powder. The powder was pulverized in an agate mortar, heated in an alumina crucible to 600° C. at a temperature increasing rate of 100° C. per hour, and further retained at 600° C. for 4 hours. As a result, vanadium oxide supporting silicon oxide having an element ratio (Y/X) of vanadium element (Y) of vanadium oxide and silicon element (X) of silicon oxide of 0.1, and a specific surface area of 53 $m^2/g$. The vanadium oxide supporting silicon oxide was subjected to an X-ray diffraction measurement. The measurement revealed that all the diffraction peaks observed were ascribed to silicon oxide, and thus it was confirmed that the vanadium oxide had an amorphous structure.

1 g of the proton conductive inorganic material powder was added to 2 g of a 5% polyvinyl alcohol (PVA) aqueous solution, and stirred at room temperature for 10 minutes to prepare a slurry. The slurry was placed in a dish made of a tetrafluoroethylene-perfluoroalkoxyvinyl ether copolymer (PFA), and the solvent was removed by drying in the atmosphere at 60° C. and 150° C. to obtain an electrolyte membrane. The ratio (S/T) of the proton conductive inorganic material (S) per the total weight of the membrane (T) was 0.9, and the thickness of the electrolyte membrane was 150 µm.

A liquid fuel cell was fabricated in the same manner as in Example 1 except that the fuel electrode and the oxidant electrode obtained in Example 1 and the proton conductive membrane obtained in Example 29 were used.

The resulting fuel cell of Example 29 was measured for the cell resistance and the maximum output power amount. The results obtained are shown in Table 5 below. The results of Example 1 and Comparative Example 1 are also shown in Table 5.

TABLE 5

|  | Fuel electrode | Electrolyte membrane | Oxidant electrode | Cell resistance (mΩ) | Maximum output power amount with 20% methanol (mW/cm2) |
|---|---|---|---|---|---|
| Example 1 | proton conductive inorganic oxide | perfluoro-sulfonic acid-containing polymer | proton conductive inorganic oxide | 25 | 13 |
| Example 29 | proton conductive inorganic oxide | proton conductive inorganic oxide | proton conductive inorganic oxide | 10 | 35 |
| Comparative Example 1 | perfluoro-sulfonic acid-containing polymer | perfluoro-sulfonic acid-containing polymer | perfluoro-sulfonic acid-containing polymer | 30 | 2.0 |

As apparent from the results in Table 5, the proton conductive material used in the electrode and the electrolyte membrane had a small resistance to provide a small cell resistance, whereby the membrane electrode composites obtained in Example 1 and Example 29 exhibited high output characteristics in comparison to the membrane electrode composite obtained in Comparative Example 1.

As having been described in detail, the invention provides such a fuel cell that has a small size with high performance and stable output, and therefore, the invention has significant value in industries.

The invention is not limited to the aforementioned specific embodiments and can be practiced with modifications in constitutional elements thereof unless the spirits and scope of the invention are deviated. A plurality of constitutional elements selected from those disclosed in the aforementioned specific embodiments may be combined to form various embodiments of the invention. For example, at least one constitutional element may be deleted from the constitutional elements shown in one of the specific embodiments, and a plurality of constitutional elements selected from a plurality of the specific embodiments may be combined.

According to the invention, an electrode for a fuel cell, a membrane electrode composite and a fuel cell that can provide stable output at from room temperature to a high temperature of about 150 (C and can improve the proton conductivity can be provided.

Obviously, numerous modifications and variations of the present invention are possible in light of the above teachings. It is therefore to be understood that within the scope of the appended claims, the invention may be practiced otherwise than as specifically described herein.

The invention claimed is:

1. An electrode for a fuel cell, comprising:
    a catalyst layer comprising
        a reduction-oxidation metal catalyst or a carrier formed with reduction-oxidation metal catalyst, and
        a proton conductive inorganic oxide coat formed on at least part of the reduction-oxidation metal catalyst or the carrier formed with reduction-oxidation metal catalyst, the proton conductive inorganic oxide coat containing an oxide superacid, the oxide superacid having an acidity function of Hammett $H_0$ of not less than −20.00 and not more than −11.93, the oxide superacid containing an oxide containing an element X and an oxide containing an element Y, the oxide containing the element X and the oxide containing the element Y being chemically bonded, wherein:
    the element X is at least one element selected from the group consisting of Titanium, Zirconium and Tin, and
    the element Y is at least one element selected from the group consisting of Tungsten and Molybdenum.

2. The electrode of claim 1, wherein a weight of the oxide superacid is not less than 0.5 weight % and not more than 60 weight % of total weight of the catalyst layer.

3. The electrode of claim 1, wherein the oxide superacid further contains an element Z, and the element Z is at least one element selected from the group consisting of Yttrium, Scandium, Lanthanum, Samarium, Gadolinium, Magnesium, Calcium, Strontium and Barium.

4. The electrode of claim 3, wherein a quantity of the element Z is not less than 0.01 mol % and not more than 40 mol % in the oxide superacid.

5. The electrode of claim 1, wherein the catalyst layer is formed by a process comprising
mixing a precursor homogeneous solution and a solvent to obtain a slurry, the precursor homogeneous solution containing the element X, the element Y, and the reduction-oxidation catalyst or the carrier formed with reduction-oxidation metal catalyst,
applying the slurry to a support, and
drying and heating the support with the slurry.

6. The electrode of claim 1, wherein the catalyst layer is formed by a process comprising
impregnating a catalyst layer with a precursor homogeneous solution, the layer containing the reduction-oxidation metal catalyst or the carrier formed with reduction-oxidation metal catalyst, the precursor homogeneous solution containing the element X and the element Y, and
drying and heating the catalyst layer containing the precursor homogeneous solution.

7. The electrode of claim 1, wherein the element X is Tin and the element Y is at least one element selected from the group consisting of Tungsten and Molybdenum.

8. The electrode of claim 1, wherein a weight of the oxide superacid is not less than 1 weight % and not more than 50 weight % of total weight of the catalyst layer.

9. The electrode of claim 1, wherein a weight of the oxide superacid is not less than 1 weight % and not more than 25 weight % of total weight of the catalyst layer.

10. A membrane electrode composite, comprising
an anode,
a cathode, and
an electrolyte membrane disposed between the anode and the cathode,
at least one of the anode and the cathode comprising a catalyst layer comprising
a reduction-oxidation metal catalyst or a carrier formed with reduction-oxidation metal catalyst, and
a proton conductive inorganic oxide coat formed on at least part of the reduction-oxidation metal catalyst or the carrier formed with reduction-oxidation metal catalyst, the proton conductive inorganic oxide coat containing an oxide superacid, the oxide superacid having an acidity function of Hammett $H_0$ of not less than −20.00 and not more than −11.93, the oxide superacid containing an oxide containing an element X and an oxide containing an element Y, the oxide containing the element X and the oxide containing the element Y being chemically bonded, wherein:
the element X is at least one element selected from the group consisting of Titanium, Zirconium and Tin, and
the element Y is at least one element selected from the group consisting of Tungsten and Molybdenum.

11. The membrane electrode composite of claim 10, wherein a weight of the oxide superacid is not less than 1 weight % and not more than 50 weight % of total weight of the catalyst layer.

12. The membrane electrode composite of claim 10, wherein a weight of the oxide superacid is not less than 1 weight % and not more than 25 weight % of total weight of the catalyst layer.

13. A fuel cell, comprising
an anode,
a cathode, and
an electrolyte membrane disposed between the anode and the cathode,
at least one of the anode and the cathode comprising a catalyst layer comprising
a reduction-oxidation metal catalyst or a carrier formed with reduction-oxidation metal catalyst, and
a proton conductive inorganic oxide coat formed on at least part of the reduction-oxidation metal catalyst or the carrier formed with reduction-oxidation metal catalyst, the proton conductive inorganic oxide coat containing an oxide superacid, the oxide superacid having an acidity function of Hammett $H_0$ of not less than −20.00 and not more than −11.93, the oxide superacid containing an oxide containing an element X and an oxide containing an element Y, the oxide containing the element X and the oxide containing the element Y being chemically bonded, wherein:
the element X is at least one element selected from the group consisting of Titanium, Zirconium and Tin, and
the element Y is at least one element selected from the group consisting of Tungsten and Molybdenum.

14. The fuel cell of claim 13, wherein a weight of the oxide superacid is not less than 1 weight % and not more than 50 weight % of total weight of the catalyst layer.

15. The fuel cell of claim 13, wherein a weight of the oxide superacid is not less than 1 weight % and not more than 25 weight % of total weight of the catalyst layer.

* * * * *